(12) United States Patent
Miyazaki et al.

(10) Patent No.: US 8,319,990 B2
(45) Date of Patent: Nov. 27, 2012

(54) PRINTING APPARATUS WITH DATA DECRYPTION

(75) Inventors: Sadaaki Miyazaki, Nagoya (JP); Naoki Hashimoto, Nagoya (JP); Norio Mizutani, Mie-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1418 days.

(21) Appl. No.: 11/691,733

(22) Filed: Mar. 27, 2007

(65) Prior Publication Data
US 2007/0255949 A1    Nov. 1, 2007

(30) Foreign Application Priority Data
Mar. 31, 2006    (JP) ................. 2006-099583

(51) Int. Cl.
*G06F 3/12*    (2006.01)
(52) U.S. Cl. ............. 358/1.15; 358/1.13; 358/1.14; 358/1.16; 358/1.18; 358/3.28; 358/434; 705/41; 705/43; 705/62; 705/71; 726/15; 726/16; 726/18; 726/23; 726/26; 726/28; 382/100; 382/175; 382/276; 709/203; 709/217; 709/228; 709/229; 725/32; 725/76; 725/133; 713/165; 713/167; 713/189; 713/183; 713/193
(58) Field of Classification Search ............. 726/28
See application file for complete search history.

(56) References Cited

U.S. PATENT DOCUMENTS

| | | | |
|---|---|---|---|
| 2004/0093410 A1* | 5/2004 | Reddy et al. | ............ 709/224 |
| 2004/0095595 A1 | 5/2004 | Jacobsen | |
| 2004/0187012 A1 | 9/2004 | Kohiyama et al. | |
| 2005/0062998 A1 | 3/2005 | Kumashio | |
| 2005/0102518 A1 | 5/2005 | Wada | |
| 2005/0210259 A1 | 9/2005 | Richardson | |
| 2005/0219610 A1 | 10/2005 | Kimura et al. | |
| 2006/0044589 A1 | 3/2006 | Nakagawaji | |
| 2007/0027895 A1* | 2/2007 | Bridges et al. | ............ 707/102 |
| 2007/0208938 A1* | 9/2007 | Hosoda | ............ 713/168 |
| 2007/0216934 A1* | 9/2007 | Yamada | ............ 358/1.15 |

FOREIGN PATENT DOCUMENTS

| | | |
|---|---|---|
| JP | 04-107057 | 4/1992 |
| JP | 6-004591 | 1/1994 |
| JP | 11-024860 | 1/1999 |
| JP | 2000-165632 | 6/2000 |

(Continued)

OTHER PUBLICATIONS

Extended European Search Report dated Jul. 3, 2007 in European Application No. EP07251297.3.

(Continued)

*Primary Examiner* — Nathan Flynn
*Assistant Examiner* — Bryan Wright
(74) *Attorney, Agent, or Firm* — Banner & Witcoff, Ltd.

(57) ABSTRACT

A printing apparatus includes a data reading unit that reads data from a storage device that can store pieces of data, the data reading unit being connectable to the storage device, an input panel that accepts an input a password used to decrypt encrypted data stored in the storage device, a password storing unit that stores the input password, a data decrypting unit that decrypts the encrypted data by using the stored password, a decrypted data storing unit that temporarily stores the decrypted data, and a re-decrypting unit that decrypts other encrypted data stored in the storage device by using the stored password.

16 Claims, 22 Drawing Sheets

FOREIGN PATENT DOCUMENTS

| | | | |
|---|---|---|---|
| JP | 2003-228262 | | 8/2003 |
| JP | 2004-118313 | | 4/2004 |
| JP | 20030042673 | * | 9/2004 |
| JP | 2005-014259 | | 1/2005 |
| JP | 2005-099948 | | 4/2005 |
| JP | 2005-216133 | | 8/2005 |
| JP | 2006-072754 | | 3/2006 |

OTHER PUBLICATIONS

Office Action in corresponding JP Application No. 2006-099583 dated Jan. 12, 2010.

* cited by examiner

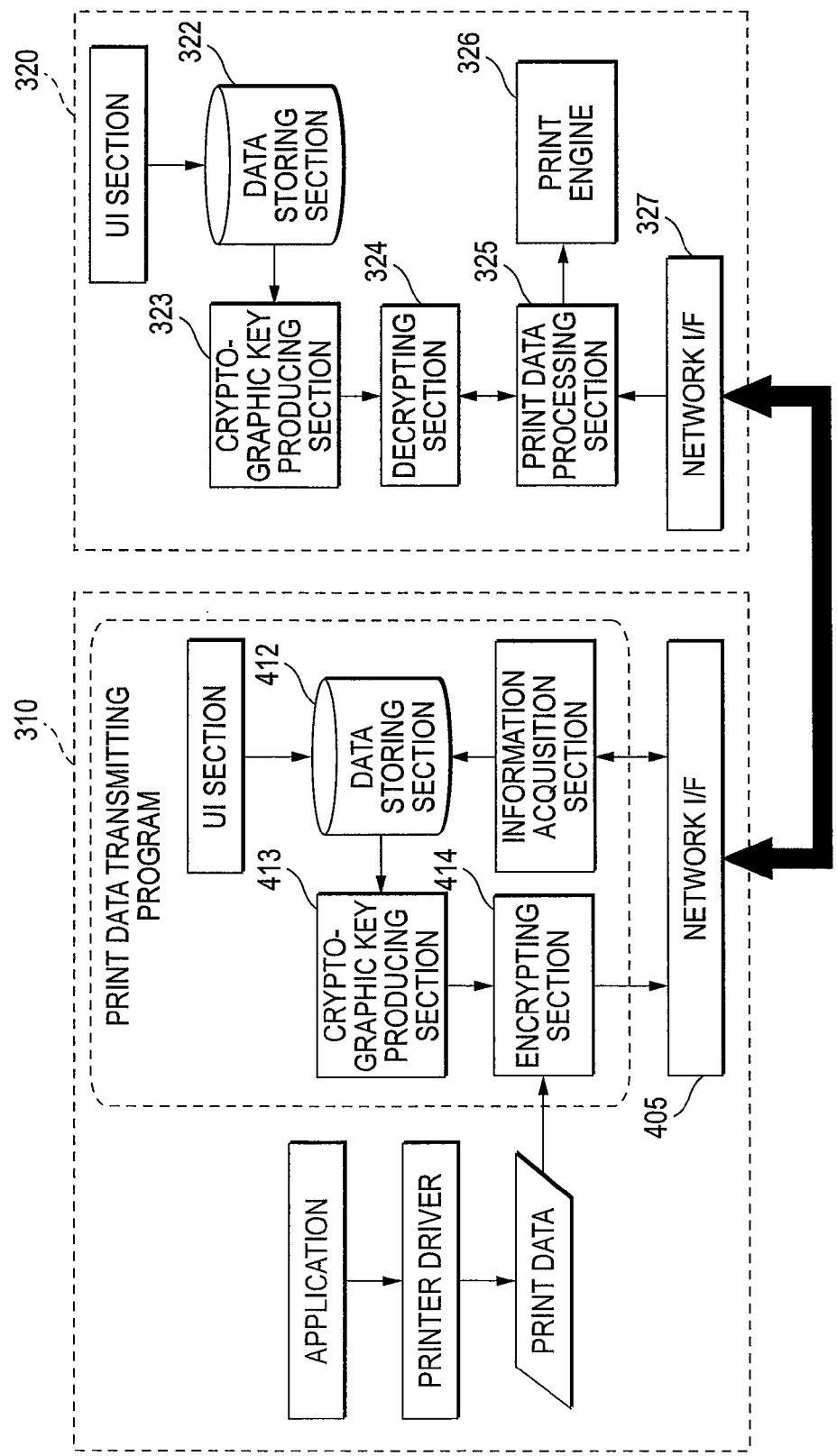

PRINTING APPARATUS WITH DATA DECRYPTION

CROSS-REFERENCE TO RELATED APPLICATION

This application claims priority from Japanese Patent Application No. 2006-099583, filed on Mar. 31, 2006, the entire subject matter of which is incorporated herein by reference.

TECHNICAL FIELD

Aspects of the present invention relate to a printing apparatus that prints out an encrypted data file by subjecting the encrypted data file to a decrypting process when the encrypted data file is printed out in a direct printing mode.

BACKGROUND

In accordance with the development of electronic equipment, various methods have been employed to use and manage pieces of data at workplaces.

In combination with a decrease in market price of memory devices, a high-capacity medium having high portability, such as a Universal Serial Bus (USB) memory or a memory card, has been used.

The memory card is accessible at high speed and is user-friendly. The memory card has been used as a storage medium that temporarily stores images taken with, for example, a digital camera. Such a memory card has come to be used for printing out images taken with the digital camera by setting the memory card directly in a printer.

Additionally, as integration degree per chip rises and storage capacity increases, a storage medium has come to be used in a wide range of purposes and has been increasingly used as a medium for data movement between personal computers (PCs). For this use, a USB memory, which is capable of being inserted into a USB slot provided in most personal computers, is widely used.

For example, there is a case in which a USB memory having a large storage capacity is used as a storage medium for data necessitated in a section of a company. Such USB memory may be managed in the section.

As the usage pattern of data is diversified as described is above, great importance has come to be placed on data confidentiality.

In recent years, in accordance with an improvement in portability of large-volume data, internal confidential documents of a company are more likely to leak out. If the confidential documents are leaked out, the company may suffer a great loss. Therefore, data security enhancement is a major task to be achieved.

Additionally, computer networks connected to the Internet are easily invaded by outsiders. Hence, files tend to be more tightly managed to combat the rise in the number of crimes committed through the networks. In the present situation, many companies impose restrictions on data movement, for example, even when an e-mail is sent together with attached data.

The same applies to a company intranet. There is a tendency to impose restrictions on the access to folders used between different sections of the company. For example, files are managed such that they are not to be read, not to be taken out and not to be printed out without permission.

Especially, if data is stored in a storage device such as the USB memory, the loss of the storage device will inevitably lead to data leakage.

Therefore, in order to enhance security for data-file management, an access key to a folder on networks or an access key to a storage device itself may be set. Additionally, data files may be encrypted such that a specific password is required for decrypting each data file.

However, such security enhancement may deteriorate usability of networks and storage devices.

For example, much time is consumed to print out an encrypted file when direct printing is performed by connecting a storage device directly to a printer without passing through a personal computer.

As described above, a desire to print out a data file stored in a storage device, such as a USB memory, has been increased.

This reflects a need to print out images taken with a digital camera by inserting a memory card directly to a printer without passing through a personal computer, or a need to print out data by inserting a memory such as a USB memory directly to a printer, from the viewpoint of the data security management of a company.

Especially if data can be managed with storage devices such as USB memories and can be printed out directly by a printer, a great security advantage will be obtained, because the usability and user-friendliness of a USB memory have been improved with an increase in storage capacity of the USB memory and because the data can be printed out directly by the printer.

However, if data stored in a storage device such as a USB memory is a piece of encrypted data in this case, a means for decrypting the encrypted data is required for the printer.

If a password has been assigned to each encrypted data file in this case, the password must be tiresomely input for each data file when a plurality of files are printed out.

Especially if each encrypted file has an individual password to decrypt the file, there is a need to confirm each password for each file. This is a complex procedure.

Furthermore, there is a case in which a password assigned to a file is set through a plurality of process steps, such as a retrieving step and a registering step. Therefore, although the security level is raised, workability is lowered. Thus, worker's operations may be affected.

JP-A-2005-99948 discloses a technique concerning an information processor capable of safely transmitting a piece of printing information to a printing apparatus and a technique concerning a printing apparatus capable of printing out the information received from the information processor.

FIG. 22 is a block diagram showing the whole structure of a system of JP-A-2005-99948.

An information processor 310 is connected to networks via a network I/F 405. Likewise, a printer 320 is connected to networks via a network I/F 327.

The information processor 310 includes a data storing section 412, a cryptographic key producing section 413 and an encrypting section 414.

The printer 320 includes a data storing section 322, a cryptographic key producing section 323, a decrypting section 324, a print data processing section 325 and a print engine 326.

In order to print out an electronic document, the information processor 310 first acquires a MAC address of the printer 320 or similar data via a network, and the cryptographic key producing section 413 produces a cryptographic key based on, for example, the MAC address. Thereafter, based on the cryptographic key, the electronic document is encrypted, and the resulting encrypted document is sent to the printer 320.

On the other hand, the printer 320 that has received the encrypted electronic document allows the cryptographic key producing section 323 to produce a cryptographic key from its own MAC address, then allows the decrypting section 324 to decrypt the encrypted electronic document received thereby and allows the print engine 326 to print out the document.

Since the completed cryptographic key is produced based on the same MAC address, for example, only the printer 320 specified by the print data processing section 325 can decrypt the encrypted electronic document. Therefore, a malicious third party can never acquire the data on the network and can never print out the data. Accordingly, the security of print data can be enhanced.

However, the aforementioned has the following problems.

According to the technique disclosed by JP-A-2005-99948, a cryptographic key used for encryption is produced based on information uniquely assigned to the printer. Therefore, if a plurality of data files stored in a storage device are printed out by the printer having the same cryptographic key, a printing operation will be scheduled to be performed only by such a specified printer at the stage where the data files are encrypted, although the usability of easily inputting a password is provided. As a result, there may be a disadvantageous possibility that another user using the printer cannot perform a printing operation.

Additionally, if a printing operation is performed via networks, a crucial problem will not arise, because a cryptographic key becomes unnecessary by a given printer performing the printing operation. However, when a data file is stored in a storage device and is encrypted, there is no point in encrypting the data file if a malicious third party knows the printer used by a user, because encryption is performed by using a MAC address of the printer.

Therefore, when a plurality of encrypted data files are intended to be printed out directly from the storage device, the technique disclosed by JP-A-2005-99948 is difficult to serve as an effective countermeasure against the problem of being required to show a password for each encrypted data file.

SUMMARY

Aspects of the present invention provide a printing apparatus capable of reducing the time and trouble of inputting a password, without lowering a security level, when a plurality of encrypted files are printed out directly from a storage device by using a printer.

An aspect of the invention provides a printing apparatus comprising: a data reading unit that reads data from a storage device that can store pieces of data, the data reading unit being connectable to the storage device; an input panel that accepts an input a password used to decrypt encrypted data stored in the storage device; a password storing unit that stores the input password; a data decrypting unit that decrypts the encrypted data by using the stored password; a decrypted data storing unit that temporarily stores the decrypted data; and a re-decrypting unit that decrypts other encrypted data stored in the storage device by using the stored password.

Another aspect of the invention provides a printing apparatus comprising: a data reading unit that reads data from a storage device that can store pieces of data, the data reading unit being connectable to the storage device; an input panel that accepts an input a password used to decrypt encrypted data stored in the storage device; a password storing unit that stores the input password; and a data decrypting unit that decrypts the encrypted data by using the password, wherein the decrypting unit uses the password stored in the password storage unit at least twice to decrypt at least two different encrypted data which are encrypted by using the same password.

BRIEF DESCRIPTION OF THE DRAWINGS

FIG. 22 is a block diagram showing the whole structure of a system of JP-A-2005-99948.

DETAILED DESCRIPTION

Illustrative aspects of the present invention will be hereinafter described with reference to the drawings.
(First Aspect)

The structure of a printer 10 will be first described.

Figure 1:
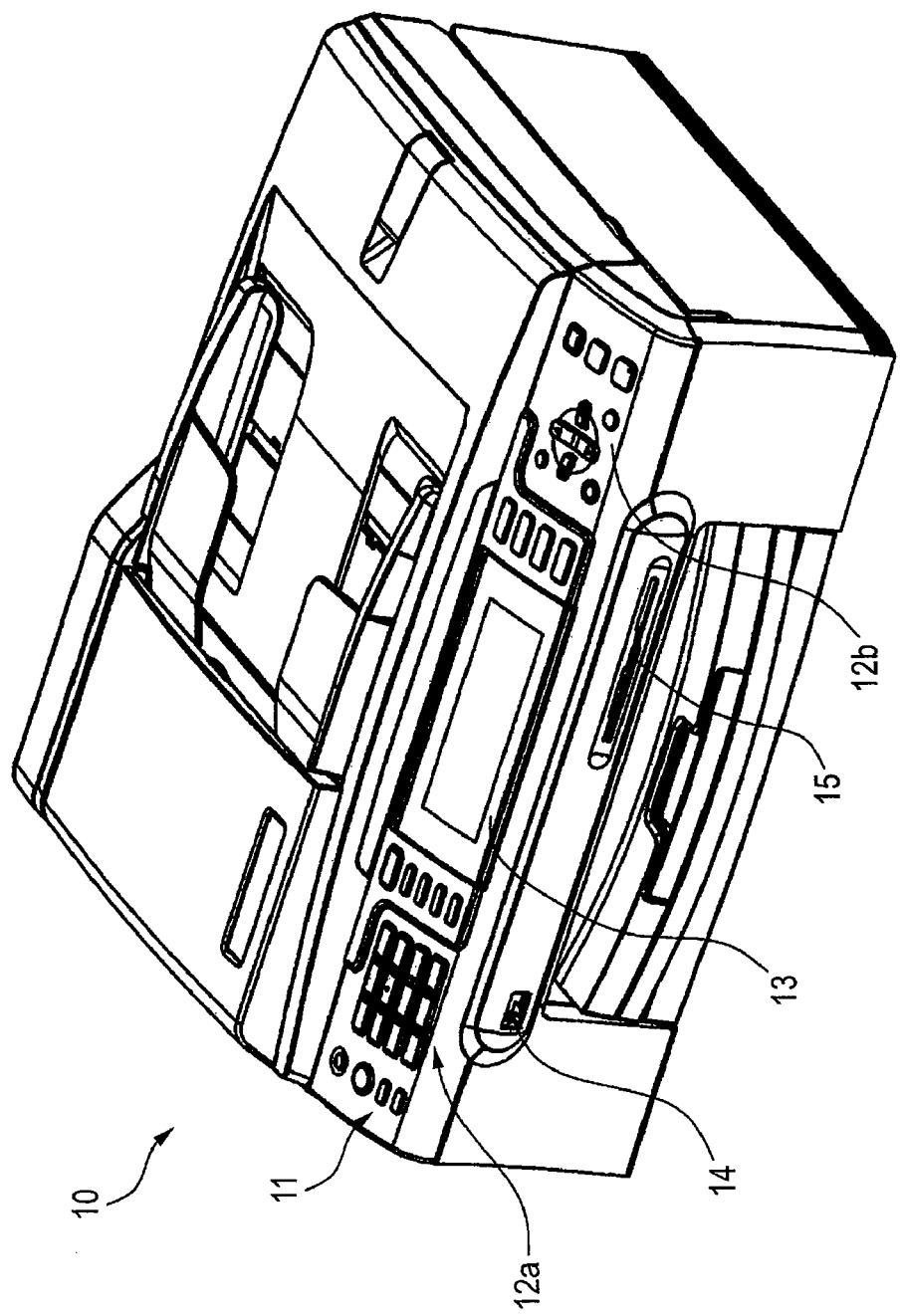
FIG. 1 is a solid perspective view of a printer according to a first aspect of the present invention.

FIG. 1 is a solid perspective view of the printer according to a first aspect of the present invention.

The printer 10 may be a multifunctional printing apparatus having a copy function, a scanner function and a fax function, in addition to a print function.

An operation panel 11 is provided on the upper surface of the printer 10. The operation panel 11 includes an input panel 12a, an operating section 12b and a liquid crystal panel display section 13 functioning as a display unit.

A USB port 14 and a slot 15 are provided at the front side of the printer 10.

Figure 2:
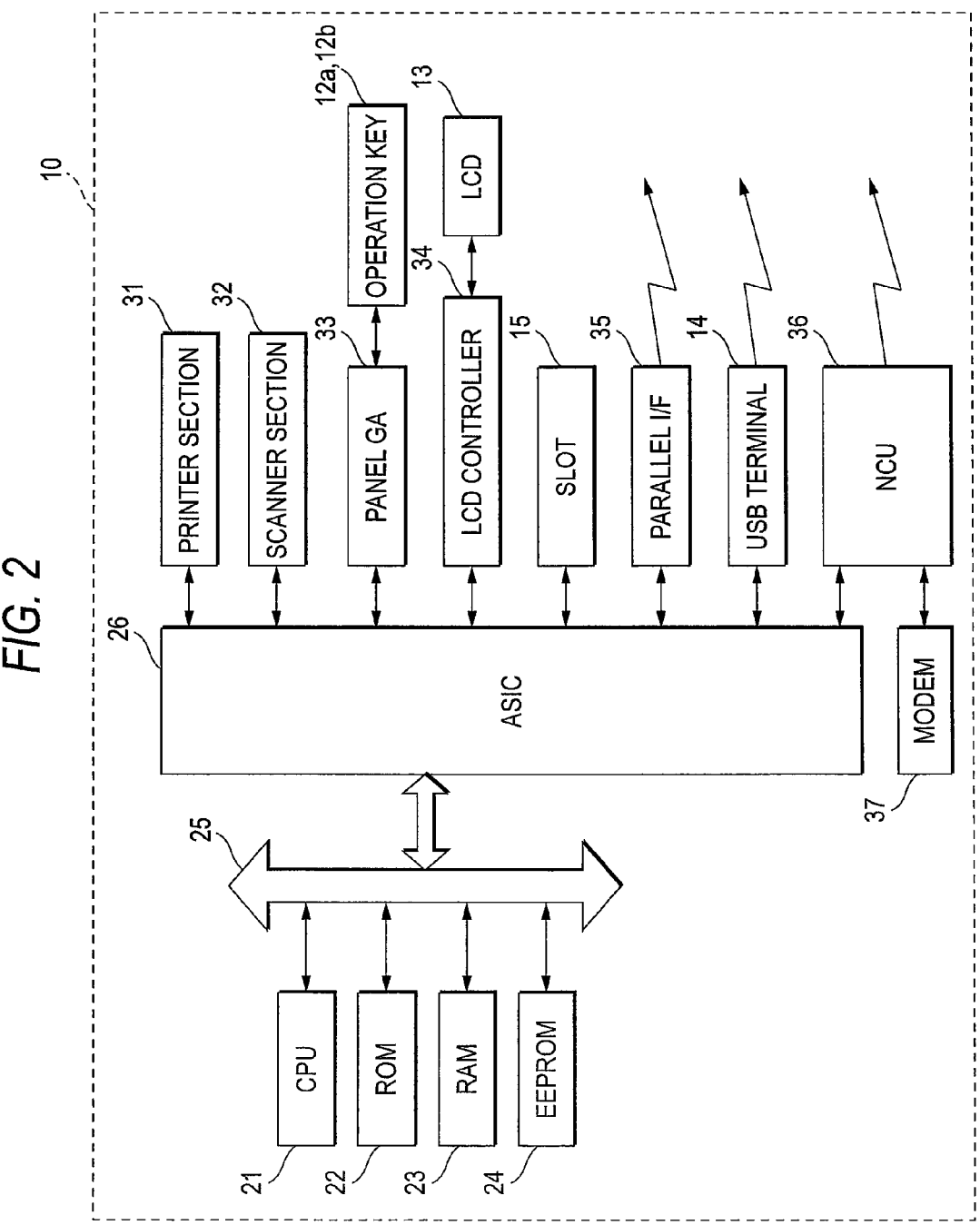
FIG. 2 is a block diagram of the printer according to the first aspect.

FIG. 2 is a block diagram showing a schematic structure of the printer according to the first aspect.

As shown in FIG. 2, in the printer 10, a CPU 21, a ROM 22, a RAM 23 and an EEPROM 24 are connected to a bus 25. An ASIC 26 is connected to the bus 25, a printer section 31, a scanner section 32, a panel GA 33, an LCD controller 34, the slot 15, a parallel I/F 35, the USB port 14 and an NCU 36, etc.

The input panel 12a and the operating section 12b are connected to the panel GA 33. The liquid crystal panel display section 13 is connected to the LCD controller 34. A modem 37 is connected to the NCU 36.

As in the same type of general printers, a user operates the input panel 12a, the operating section 12b and the liquid crystal panel display section 13 included in the operation panel 11 of the printer 10. Accordingly, printing operation of the printer 10 can be performed.

The printer 10 may print out data stored in a storage device in a direct printing mode by connecting a storage device, such as a USE memory 50, which serves to store pieces of data, to the USE port 14 functioning as a data readout unit provided in the printer 10. Alternatively, the printer 10 may print out data stored in a storage device by connecting a storage device such as a memory card (not shown) to the slot 15.

Herein, any type of storage device can be used as the storage device so long as the storage device is a medium capable of being connected to or disconnected from the printer 10 when the printer 10 is operating. As an example used in the following explanation in this aspect, the USE memory 50 is used as the storage device.

Additionally, let it be supposed that the printer section 31 functioning as a print engine has an engine using, for example, a laser beam. However, since usage of another type of print engine other than the laser beam using engine never affects the present invention, various types of print engines can be used.

Figure 3:
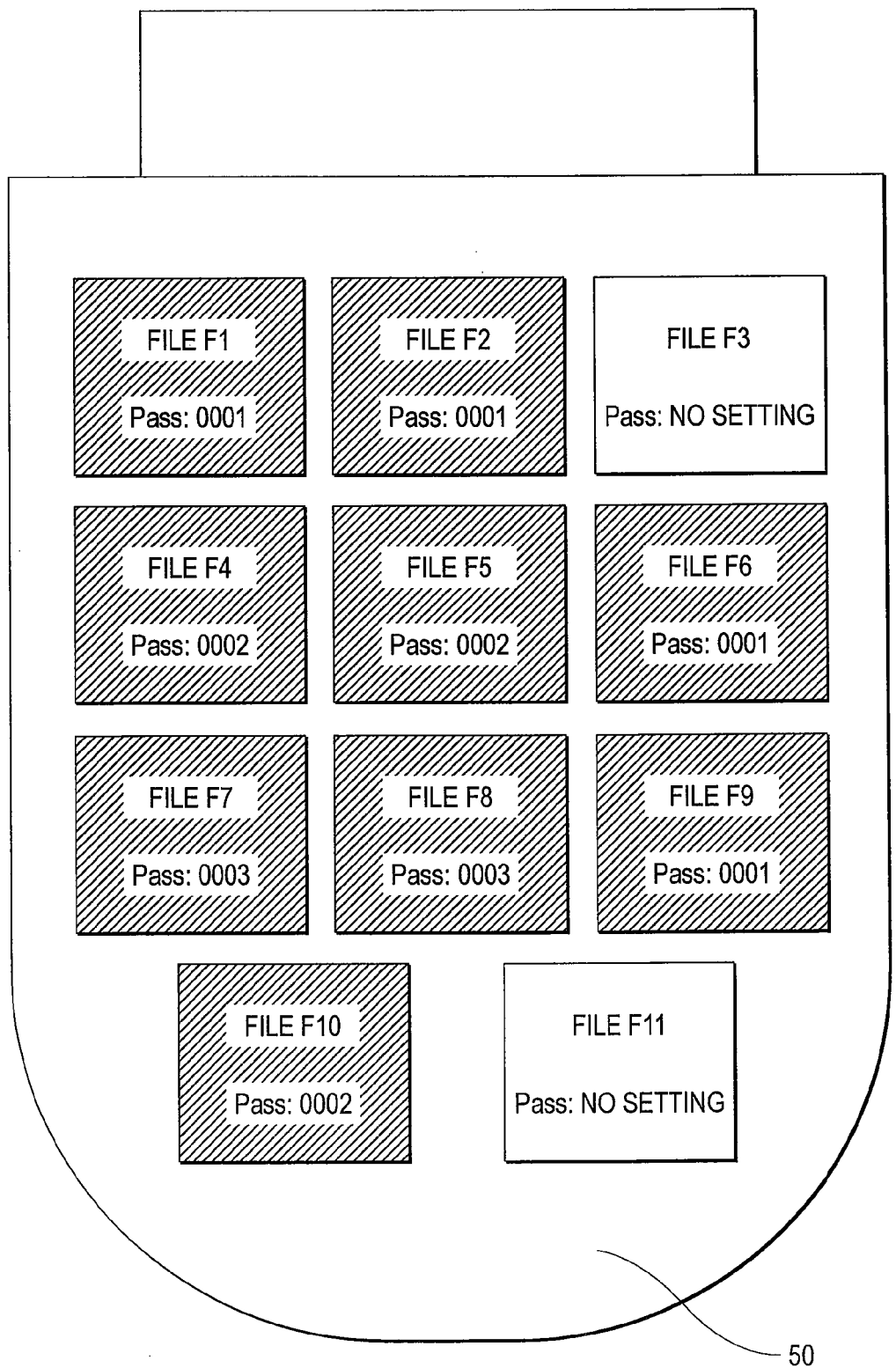
FIG. 3 is a schematic view showing a storage device and files stored in the storage device according to the first aspect.

Next, operations in the first aspect will be described,

FIG. 3 is a schematic view showing the storage device according to the first aspect and files stored in the storage device.

The USB memory 50 is a storage device that is used as a data storage medium by being inserted into the USE port 14 formed in the printer 10. A file F1 to a file F11 are stored in the storage area of the USB memory 50.

Thereamong, the files F1, F2 and F4 to F10 are encrypted, and passwords are required to be input for reading these files. The files F3 and F11 are not encrypted.

For convenience of explanation, let it be supposed that the files F1, F2, F6 and F9 are encrypted by using the same password "0001," as an example.

Likewise, let it be supposed that the files F4, F5 and F10 are encrypted by using the same password "0002" as an example.

Likewise, let it be supposed that the files F7 and F8 are encrypted by using the same password "0003" as an example.

Figure 4:
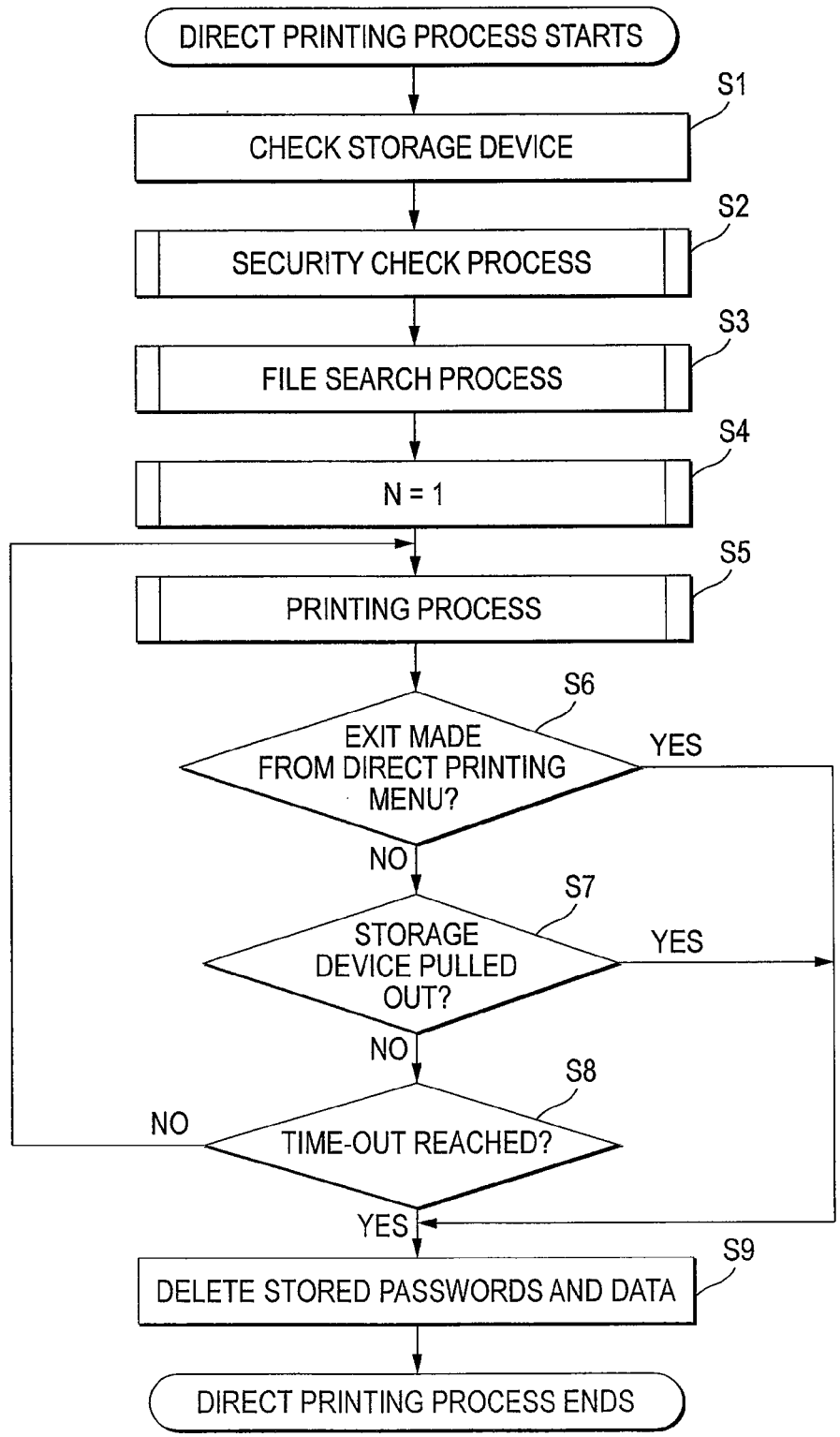
FIG. 4 is a flowchart when direct printing is performed in the first aspect.

FIG. 4 is a flowchart of steps followed when direct printing is performed, which is a main flow in the first aspect.

When a user of the printer 10 performs direct printing by inserting the USB memory 50 into the USB port 14, the internal processing of the printer 10 is performed with the flow shown in FIG. 4.

When a direct printing process is started, the storage device is checked at step S1. In this aspect, the start of the direct printing process is conditional on the fact that the storage device has been connected. Therefore, a detailed description is omitted of checking whether the USE memory 50 is present or absent and whether the USB memory 50 is in a normal accessible state. If a fail in checking the storage device occurs here, the process is ended, although the flowchart of FIG. 4 does not show this.

If the USB memory 50 is of a type that is required to make a security setting and a password is required to be input a password when the USB memory 50 starts being used, the process is performed here.

At step S2, the process skips to a subroutine of a security check process. The security check process is a subroutine to acquire a password, and will be later described in detail with reference to the drawings.

If the security check process is ended, the process skips to a subroutine of a file search process for searching files at step S3. The file search process 5 searches or retrieves files stored in the USB memory 50, and will be later described in detail with reference to the drawings.

If a file that can be printed is found through the file search process, a file management table is produced and is stored in the RAM 23.

The process then proceeds to step S4 where variables are initialized. In this aspect, for convenience of explanation, a variable N for a printing process is set.

At step S5, the process skips to a subroutine of a printing process. The printing process prints out the contents of data files stored in the USB memory 50, which will be later described in detail with reference to the drawings.

The process then proceeds to steps S6, S7 and S8 where a check whether the routine has been discontinued is made.

In the first aspect, a check whether an exit occurs from a direct printing menu is made at step S6, a check whether the storage device has been pulled out is made at step S7, and a check whether a time-out has been reached is made at step S8.

If these flags are ON, stored passwords and all data opened during the process are deleted at step S9, and the direct printing process is ended.

When the data are deleted, sufficient care for security, such as the overwriting of meaningless data, is taken so that the internal storage is completely erased.

If the flags are not ON at steps S6, S7 and S8, the process again returns to the subroutine of the printing process of step S5.

A check whether an exit has been made from a direct printing menu, which is made at step S6, ends the process if the user gives instructions to end the direct printing.

A check whether the storage device has been pulled out, which is made at step S7, ends the process in accordance with an intention with which the user ends the direct printing by directly pulling out the USB memory 50.

Alternatively, this check made at step S7 ends the process as a measure against the possibility that an unexpected accident will cause the USB memory 50 to slip off from the printer 10 or to break down.

A check whether a time-out has been reached, which is made at step S8, improves a security level. In other words, when a user leaves the printer 10 neglected in a state in which a password is being input therein, this check is made to impose given limitations so that another user does not freely print out or display a printer-operation file without permission.

Preferably, an interruption check is also made during other subroutines although no description of the confirmation of the time-out is given. Since a malicious third person can easily print out data, for example, when a user leaves the printer 10, this check has the meaning of preventing such a malicious act.

Next, description will be given of the contents of the subroutine of FIG. 4.

First, description will be given of the subroutine of the security check process performed at step S2 of FIG. 4.

Figure 5:
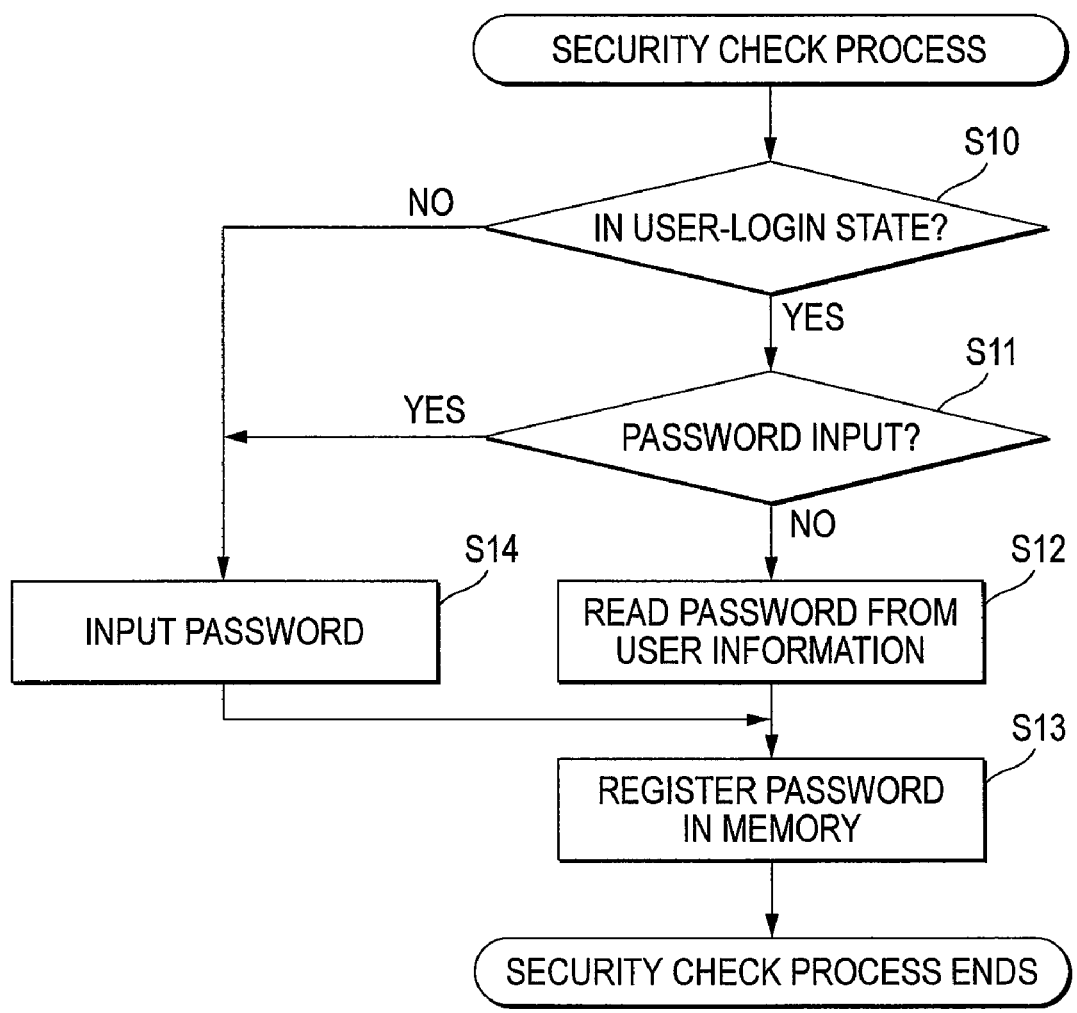
FIG. 5 is a flowchart showing the subroutine of a security check process according to the first aspect.

FIG. 5 is a flowchart showing the subroutine of the security check process according to the first aspect.

In the security check process, a process to acquire a password for files stored in the USB memory 50 is performed.

A check whether a user is in a login state is made at step S10. The printer 10 is structured so as to operate in accordance with a setting that corresponds to a user ID if the user ID and a password corresponding to this user ID are input when the printer 10 is actuated or when the print function, the copy function, the scanner function, or the fax function described above is selected as an execution mode.

A user ID, a password and setting information are pre-stored as user information in the thus structured printer.

A user occasionally uses a password, which is identical to the password prestored as user information in the printer 10, as a file-reading password.

If the user inserts the USB memory 50 into the printer 10 in a preset login state (S10: Yes), a confirmation of whether a password is input or not is required of the user at step S11. It the user is not in a login state (S10: No), the process proceeds to step S14.

The input of a selection of whether the password is input or not is received from the user at step S11. If the input indicates that the password is not input (S11: No), the password is read from the user information at step S12. The password is registered in a password storage area that functions as a password storage unit of the RAM 23 at step S13. If the input indicates that the password is input at step S11 (S11: Yes), the process proceeds to step S14.

At step S14, the password is input by using the input panel 12a if the user is not in a user login state at step S10 (S10: No), or if a selection to input the password is made at step S11 (S1: Yes). At step S13, the password is registered in the password storage area of the RAM 23.

For convenience of explanation, let the password obtained at steps S12 and S14 be "10001" as an example The security check process is ended in this way.

Next, description will be given of a subroutine of the file search process performed at step S3 of FIG. 4.

Figure 6:
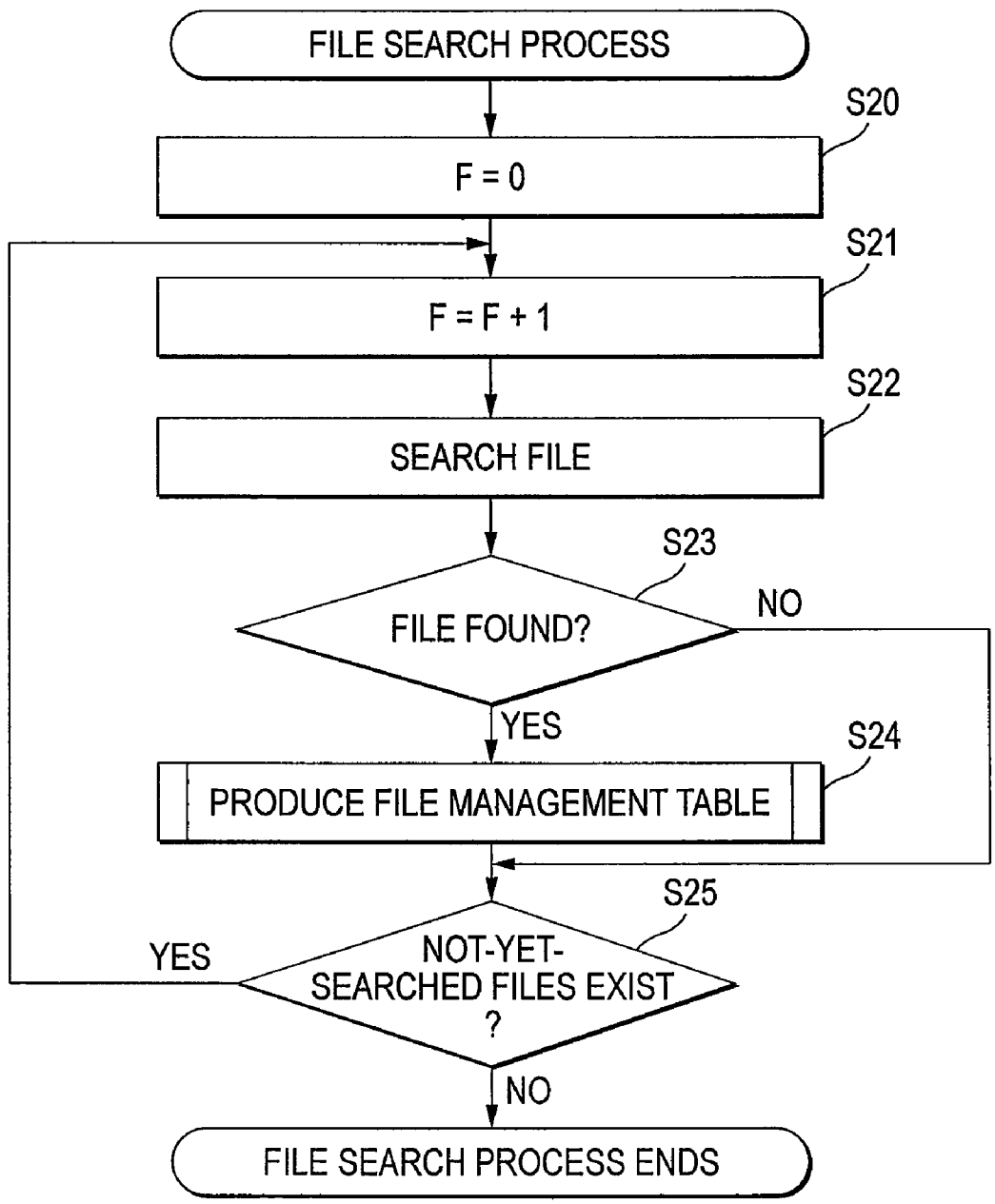
FIG. 6 is a flowchart showing the subroutine of a file search process according to the first aspect.

FIG. 6 is a flowchart showing the subroutine of the file search process according to the first aspect.

In the file search process that functions as a data retrieving unit, an operation to examine files stored in the USB memory 50 is performed.

A file search variable F is initialized at step S20. The file search variable F is then counted up at step S21.

Files in the USB memory 50 are searched at step S22. Files F1 to F11 are stored in the USB memory 50 and are sequentially searched or retrieved. For example, if the file search variable F is 1, the file F1 will be found.

A confirmation of whether a file has been found is made at step S23, and since the file F1 has been found here (S23: Yes), the process proceeds to a subroutine of a file management table production at step S24.

In the subroutine of the file management table production, files stored in the USB memory 50 are examined, and the state of the files is recorded in RAM 23 so as to be used in other subroutines. Details thereof will be later described with reference to the drawings.

If no file has been found at step S23 (S23: No), the process proceeds to step S25.

A check as to whether not-yet-searched files exist is made at step S25. If not-yet-searched files exist (S25: Yes), the file search variable F is again counted up to search the following file at step S21.

If not-yet-searched files do not exist at step S25 (S25: No), the file search process is ended.

All files stored in the USB memory 50 are searched in this way.

Next, description will be given of the subroutine of the file management table production performed at step S24 of FIG. 6.

Figure 7:
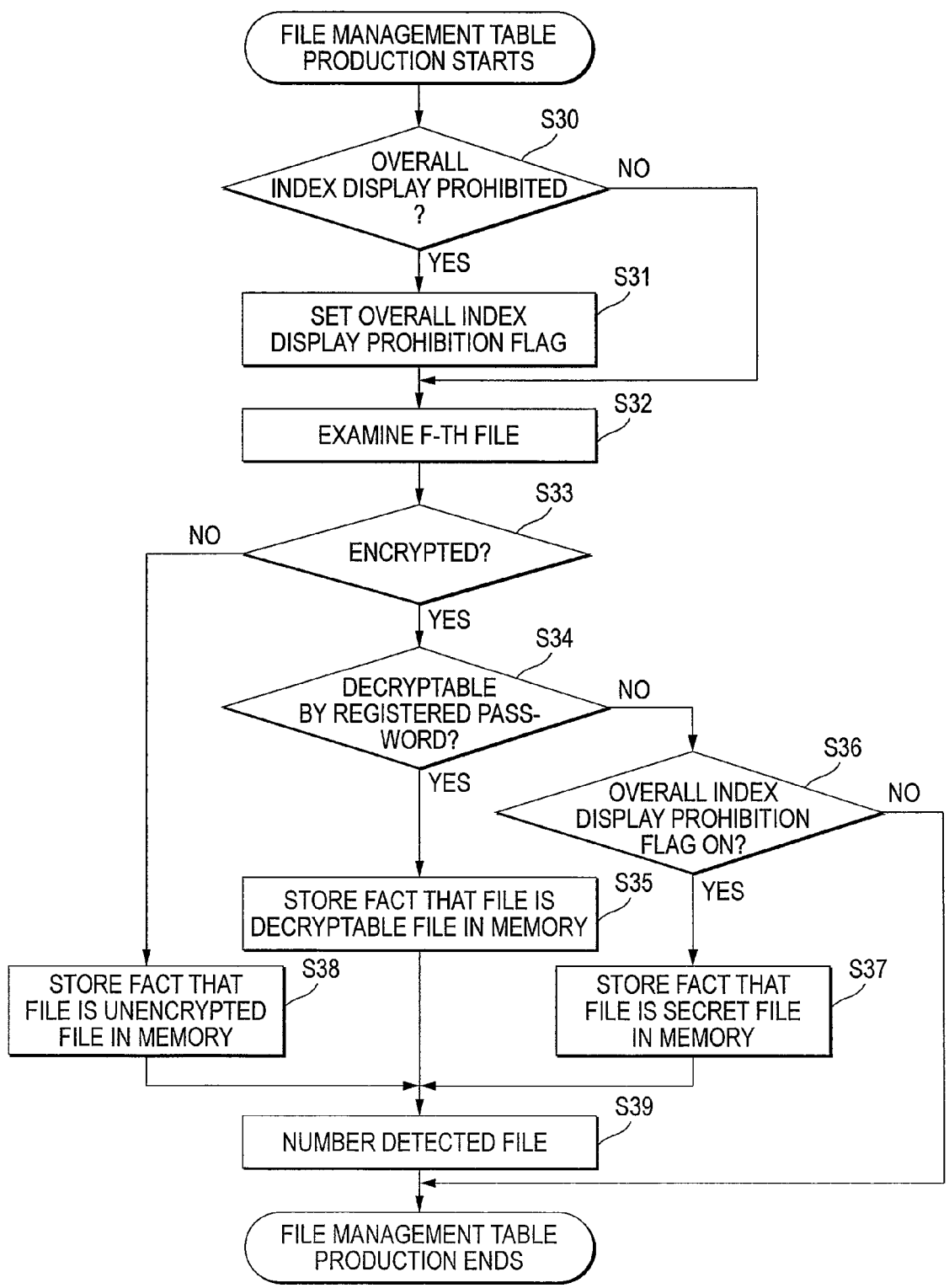
FIG. 7 is a flowchart showing the subroutine of a file management table production according to the first aspect.

FIG. 7 is a flowchart showing the subroutine of the file management table production according to the first aspect.

In the subroutine of the file management table production, the state of files stored in the USB memory 50 is examined, and a file management table is formed in an area provided in the RAM 23.

After branching from the subroutine of the file search process, a determination as to whether the overall index display is prohibited is made at step S30.

Whether or not the overall index display is prohibited depends on a security level to be set. In this aspect, that can be determined by a security setting that is set in the USB memory 50 functioning as a storage device, or can be determined by a security setting that is set in the printer 10.

If a determination that the overall index display is prohibited is made at step S30 (S30: Yes), a flag showing a prohibition against the overall index display is made ON at step S31.

An examination as to whether the F-th file has been encrypted is made at step S32. A file search variable F that is set in FIG. 6 is used here. The value of the file search variable F is counted up at step S21 of FIG. 6.

If a determination that the F-th file has been encrypted is made at step S33 (S33: Yes), the process proceeds to step S34 where an examination as to whether the F-th file can be decrypted by a registered password is made. If the F-th file has not been encrypted (S33: No), the process proceeds to step S38.

If the F-th file selected above can be decrypted by a password registered in the RAM 23 at step S34 (S34: Yes), the process proceeds to step S35 where the fact that the F-th file can be decrypted is stored in an area of the file management table provided in the RAM 23. If the F-th file cannot be decrypted, the process proceeds to step S36.

If a determination that the S-th file has not been encrypted is made at step S33 (S33: No), the process proceeds to step S38 where the fact that the F-th file detected above is an unencrypted file is stored in an area of the file management table provided in the RAM 23.

If the F-th file detected at step S34 has been encrypted (S33: Yes) and cannot be decrypted by the registered password (S34: No), the process proceeds to step S36 where a confirmation of whether an overall index display flag is ON is made. If the overall index display flag is in an ON state (S36: Yes), the process proceeds to step S37 where the fact that the F-th file is a secret file is stored in the memory.

If an overall index display prohibition flag is not in an ON state at step S36 (S36: No), the files are not numbered. In other words, if not in an ON state, information concerning a file is not stored in the file management table.

The file detected as the F-th file is numbered at step S39. The total number of files detected at this time is stored in the RAM 23.

All files stored in the USB memory 50 are examined, and necessary information is stored in the file management table by looping the subroutine of the file management table production as a file search process.

Figure 8A:
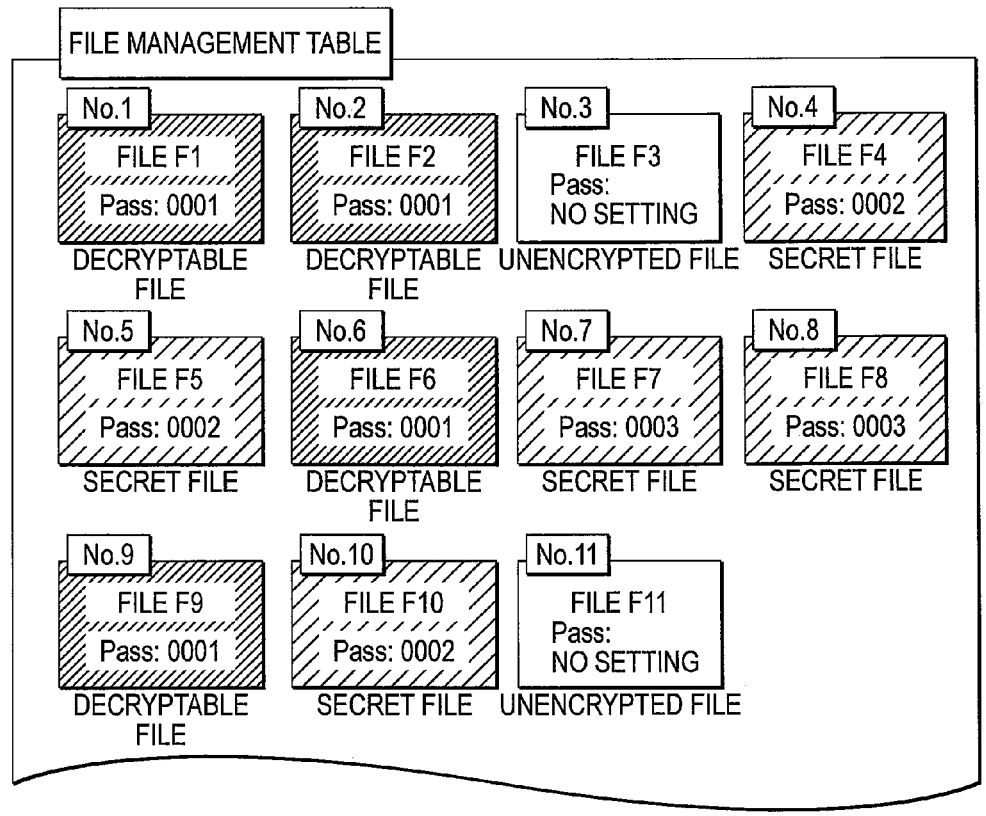
FIG. 8A shows an image of the inside of a storage device stored in a file management table when the overall index display is not prohibited according to the first aspect.
Figure 8B:
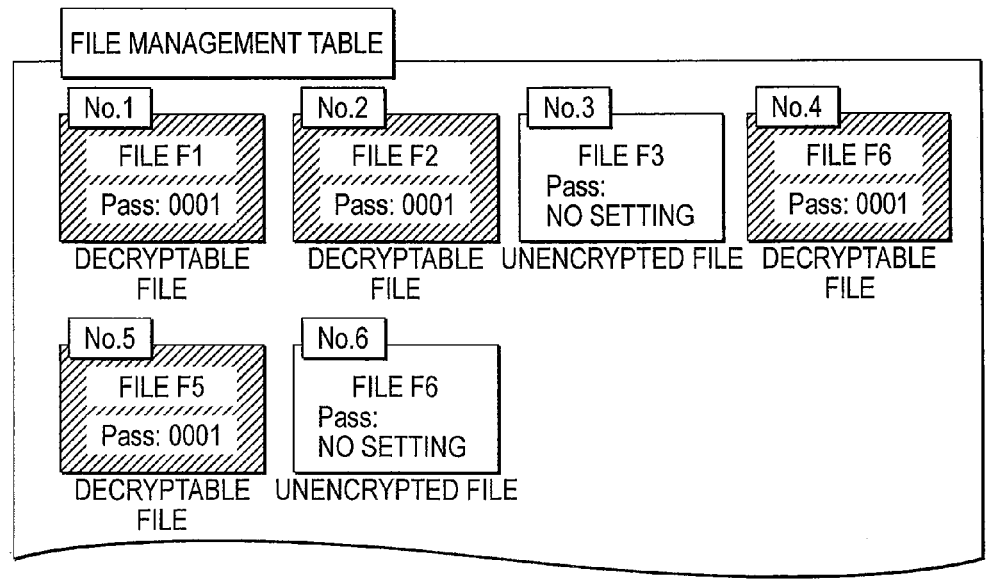
FIG. 8B shows an image of the inside of a storage device stored in a file management table when the overall index display is prohibited according to the first aspect.

FIG. 8A and FIG. 8B show the contents stored in the file management table.

FIG. 8A shows an image in the storage device stored in the file management table when the overall index display in the first aspect is not prohibited, FIG. 8B shows an image in the storage device stored in the file management table when the overall index display in the first aspect is prohibited.

Since data of the files F1 to F11 are stored in the USB memory 50 as shown in FIG. 3, information about features or characteristics of each file is registered in the file management table.

For example, if the password registered in the RAM 23 is "00001," the files F3 and F11 that have not been encrypted are registered in the file management table as unencrypted files, as a result of a confirmation at step S33 of the subroutine of the file management table production of FIG. 7.

Additionally, as a result of a confirmation at step S34 of FIG. 7, the files F1, F2, F6 and F9, which can be decrypted by the registered password, are classified as decryptable files at step S35.

Additionally, as a result of a confirmation at step S36 of FIG. 7, the files F4, F5, F7, F8 and F10, which cannot be decrypted by registered passwords other than the above one, are classified as secret files.

However, there is a difference in the contents of the file management table between a case in which a determination that the overall index display is not prohibited at step S30 of FIG. 7 and a case in which a determination that the overall index display is prohibited at step S30.

In more detail, if the overall index display is not prohibited, all the contents of the files F1 to F11 are stored in the file management table as shown in FIG. 8A, and numbers 1 to 11 are assigned thereto in order of the data files.

On the other hand, if the overall index display is prohibited, only six files, i.e., the files F1, F2, F3, F6, F9 and F11 are stored in the USB memory 50 as shown in FIG. 8B. Accordingly, numbers 1 to 6 are assigned thereto.

Next, description will be given of the subroutine of the printing process performed at step S5 of FIG. 4.

Figure 9:
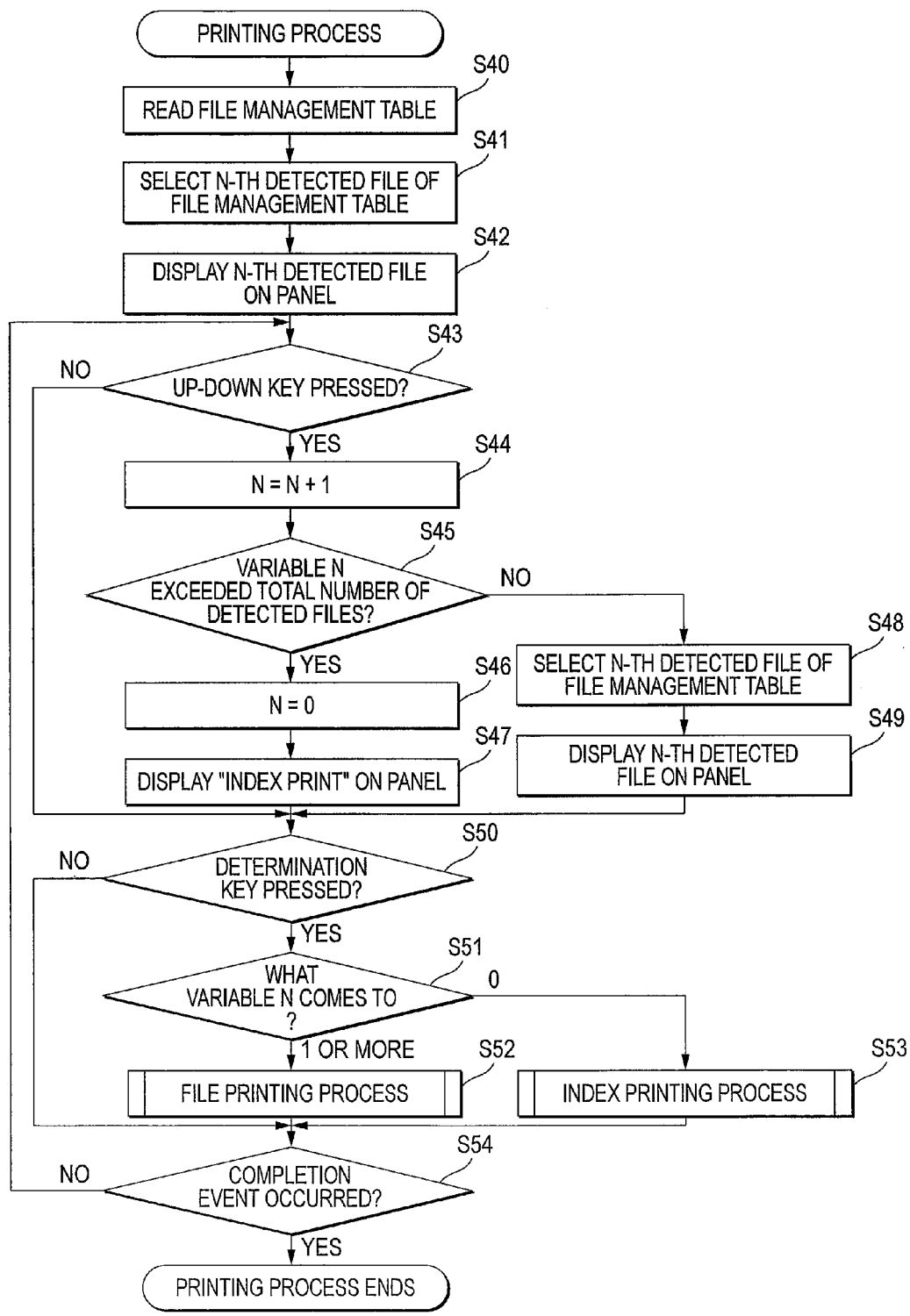
FIG. 9 is a flowchart showing the subroutine of a printing process according to the first aspect.

FIG. 9 is a flowchart showing the subroutine of the printing process according to the first aspect.

In the subroutine of the printing process, either a file printing process or an index printing process is selected.

The file management table recorded in the RAM 23 is read at step S40. An N-th detected file of the file management table is selected at step S41. Since numeral 1 has been pre-assigned to the printing variable N used for printing process at step S4 of FIG. 4 in this aspect, the file F1, which is the first file, is selected. The process then proceeds to step S42.

An N-th searched file is displayed on the liquid crystal panel display section 13 at step S42. Therefore, since the printing variable N is 1, a file name, or the like, of the file F1 is displayed thereon.

The process then proceeds to step S43 where a determination as to whether the up-down key has been pressed in the operating section 12b is made. If the up-down key has been pressed (S43: Yes), the process proceeds to step S44. If not (S43: No), the process proceeds to step 350.

The printing variable N is counted up at step S44.

Figure 10:
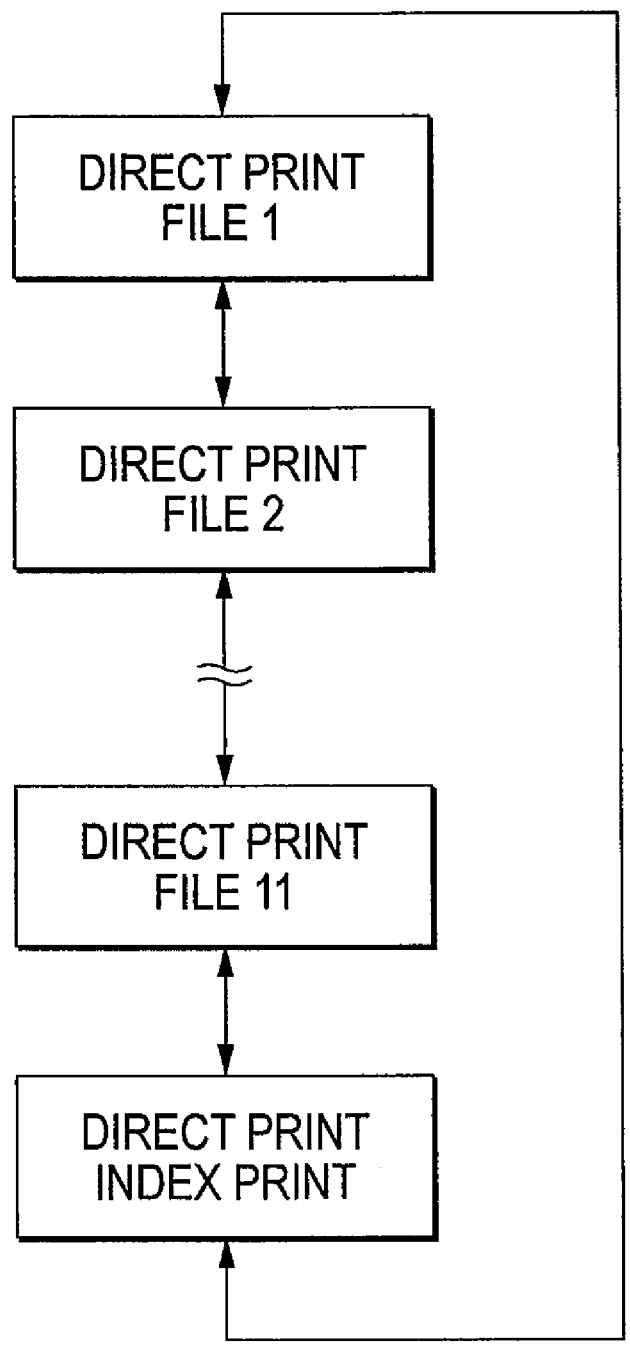
FIG. 10 shows an operation image of files stored in a storage device according to the first aspect.

FIG. 10 shows an operation image of files stored in the storage device according to the first aspect.

An N-th file, which is a presently-selected file, is shown on the liquid crystal panel display section 13. The N-th file is changed to another by operating the operating section 12b. In response to this, the value of the printing variable N used as a variable is increased or decreased.

Although this process is performed through the subroutine, the contents thereof are not necessitated to describe the present invention in the first aspect. Hence, description thereof is omitted.

If the overall index display is not prohibited, information concerning the 11 files is stored in the file management table as shown in FIG. 8A. Therefore, the total number of detected files is 11, and the item index printing is added in addition thereto so as to be selected on the liquid crystal panel display section 13.

If the overall index display is prohibited, information concerning the six files is stored in the file management table as shown in FIG. 8B. Accordingly, the total number of detected files is 6.

As a result of counting up the printing variable N, the form shown in FIG. 10 is displayed on the liquid crystal panel display section 13.

A determination as to whether the value of the printing variable N has exceeded the total number of searched files is made at step S45 of FIG. 9. If the value of the printing variable N has exceeded the total number of searched files (S45: Yes), the process proceeds to step S46. If not (S45: No), the process proceeds to step S48.

Numeral 0 is assigned to the printing variable N at step S46. The process then proceeds to step S47.

"INDEX PRINT" is displayed on the liquid crystal panel display section 13 at step S47. The process then proceeds to step S50.

The same operation as at step S41 is performed at step S48. That is, the N-th file of the file management table is selected at step S48. The process then proceeds to step S49.

The N-th searched file selected at step S48 is displayed on the liquid crystal panel display section 13 at step S49.

A confirmation of whether a determination key provided in the operating section 12b has been pressed is made at step S50. If the determination key has been pressed (S50: Yes), the process proceeds to step S51. If not (S50: No), the process proceeds to step S54.

The value of the printing variable N is checked at step S51. It the value of the printing variable N is "0" (S51: 0), the process proceeds to step S53. If the value of the printing variable N is "1 or more" (S51: 1 or more), the process proceeds to step S52.

The subroutine of the file printing process is executed at step S52. The contents of this will be described later. The process then proceeds to step S54.

The subroutine of the index printing process is executed at step S53. The contents of this will be later described later. The process then proceeds to step S54.

A check as to whether a completion event has occurred is made at step S54. This completion event is the same as the contents shown at steps S6, S7 and S8 of FIG. 4. This process is performed because a setting to be looped until the completion event occurs is provided in the printing process routine of FIG. 9. If the completion event has occurred (S54: Yes), the subroutine of the printing process is ended. If not (S54: No), the process proceeds to step S43.

Next, description will be given of the subroutine of the file printing process performed at step S52 of FIG. 9.

Figure 11:
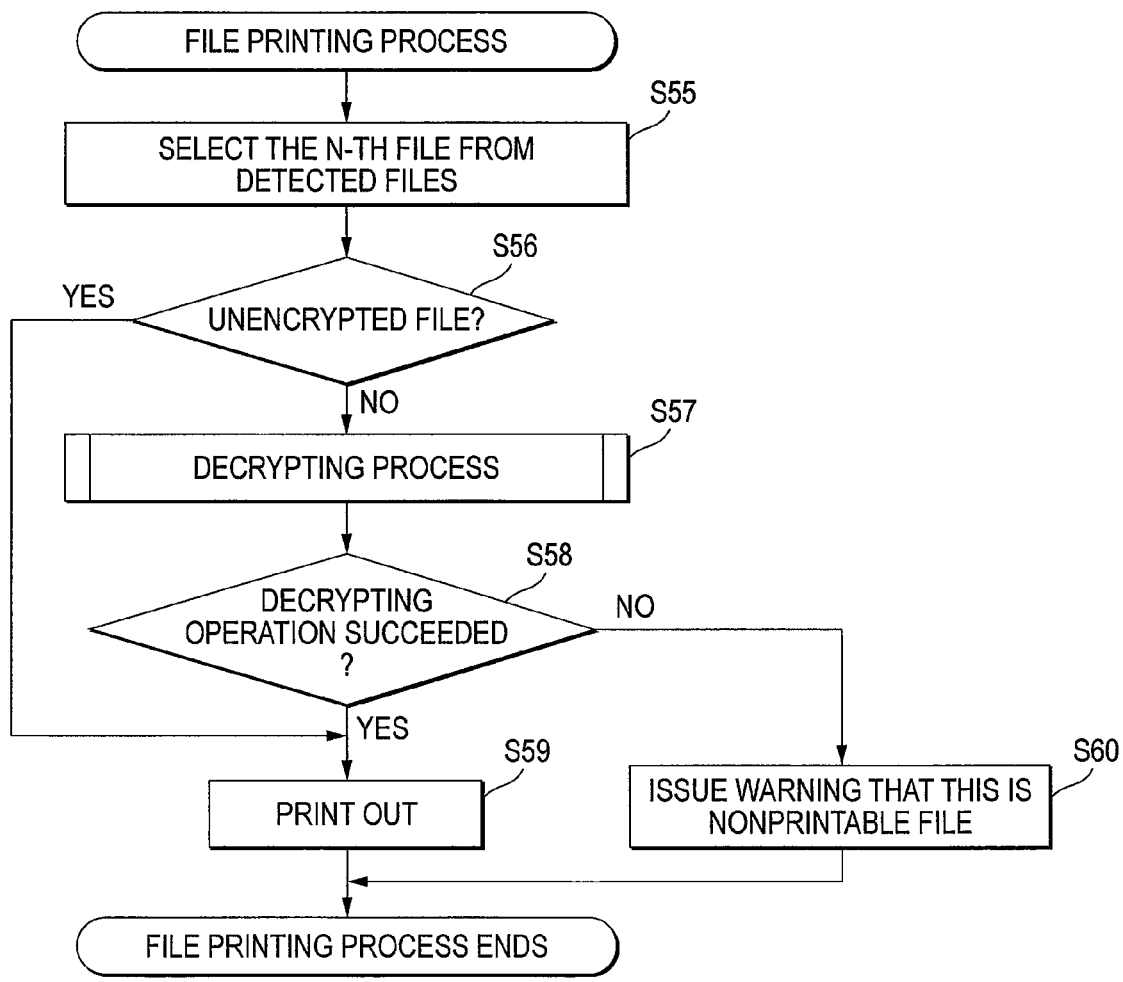
FIG. 11 is a flowchart showing the subroutine of a file printing process according to the first aspect.

FIG. 11 is a flowchart showing the subroutine of the file printing process according to the first aspect.

In the subroutine of the file printing process, a printing process of a selected file is performed.

First, an N-th file that has been detected in the USB memory 50 and that has been stored in the file management table is selected at step S55. If the printing variable N used for printing is 1, the file F1 in the USB memory 50 is selected.

The data management table stored in the RAM 23 is examined, and an examination as to whether this file is an unencrypted file is made at step S56. If this is not an unencrypted file (S56: No), the N-th file is an encrypted file.

If a prohibition flag of the overall index display is in an ON state at step S31 in the flow of FIG. 7, the encrypted file is a decryptable file here. If not, the encrypted file is either a decryptable file or a secret file.

Therefore, the subroutine of the decrypting process is executed at step S57.

A determination as to whether a decrypting operation has succeeded in the subroutine of step S57 is made at step S58. If the decrypting operation has succeeded (S58: Yes), the contents of the file decrypted at step S57 are output by the printer section 31 at step S59, and this subroutine is completed.

If a determination that the decrypting operation has failed is made at step S58 (S58: No), a warning that this is a non-printable file is issued at step S60, and the subroutine is completed. The warning may be printed out by the printer section 31, or may be displayed on the liquid crystal panel display section 13.

If a determination that this is an unencrypted file is made at step S56 (S56: Yes), printing is performed at step S59 without performing the decrypting process, and the subroutine of the file printing process is completed.

Next, description will be given of the subroutine of the decrypting process performed at step S57 of FIG. 11.

Figure 12:
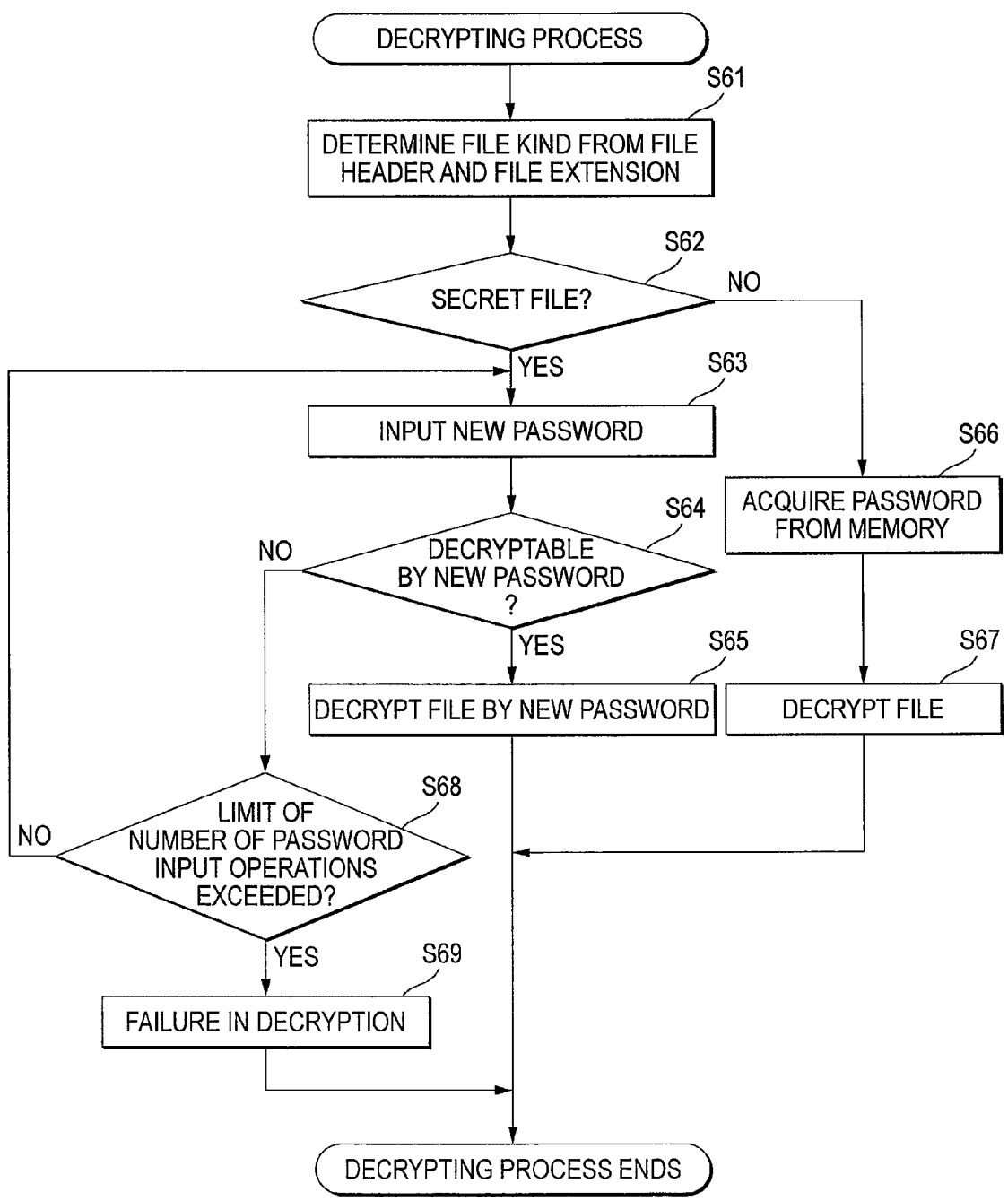
FIG. 12 is a flowchart showing the subroutine of a decrypting process according to the first aspect.

FIG. 12 is a flowchart showing the subroutine of the decrypting process according to the first aspect.

In the subroutine of the decrypting process, a selected file is decrypted.

First, the kind of a selected N-th file is determined from a header and an extension of the file at step S61.

Based on information managed by the file management table, an examination as to whether the selected N-th file is a secret file is made at step S62.

If the file is not a secret file (S62: No), the selected N-th file is a decryptable file. Hence, a password stored in the RAM 23 is acquired at step S66. If the file is a secret file (S62: Yes), the process proceeds to step S63.

The password is acquired from the RAM 23 at step S66, and then the file is decrypted at step S67, thus completing the decrypting process.

If the file is a secret file (S62: Yes), the file cannot be decrypted by the password stored in the RAM 23. Therefore, a new password is required at step S63, and the input panel 12a is allowed to input the new password.

If the file can be decrypted by the new password at step S64 (S64: Yes), the file is decrypted by the new password at step S65, thus completing the decrypting process.

If the N-th secret file cannot be decrypted at step S64 (S64: No), a confirmation of whether the limit of the number of password input operations has been exceeded is made at step S68. If not (S68: No), the process proceeds to step S63 where a new password is again required to execute decryption.

On the other hand, if the limit of the number of password input operations has been exceeded at step S68, a failure-in-decryption flag is made ON at step S69, thus completing the decrypting process.

Next, description will be given of the subroutine of the index printing process performed at step S53 of FIG. 9.

Figure 13:
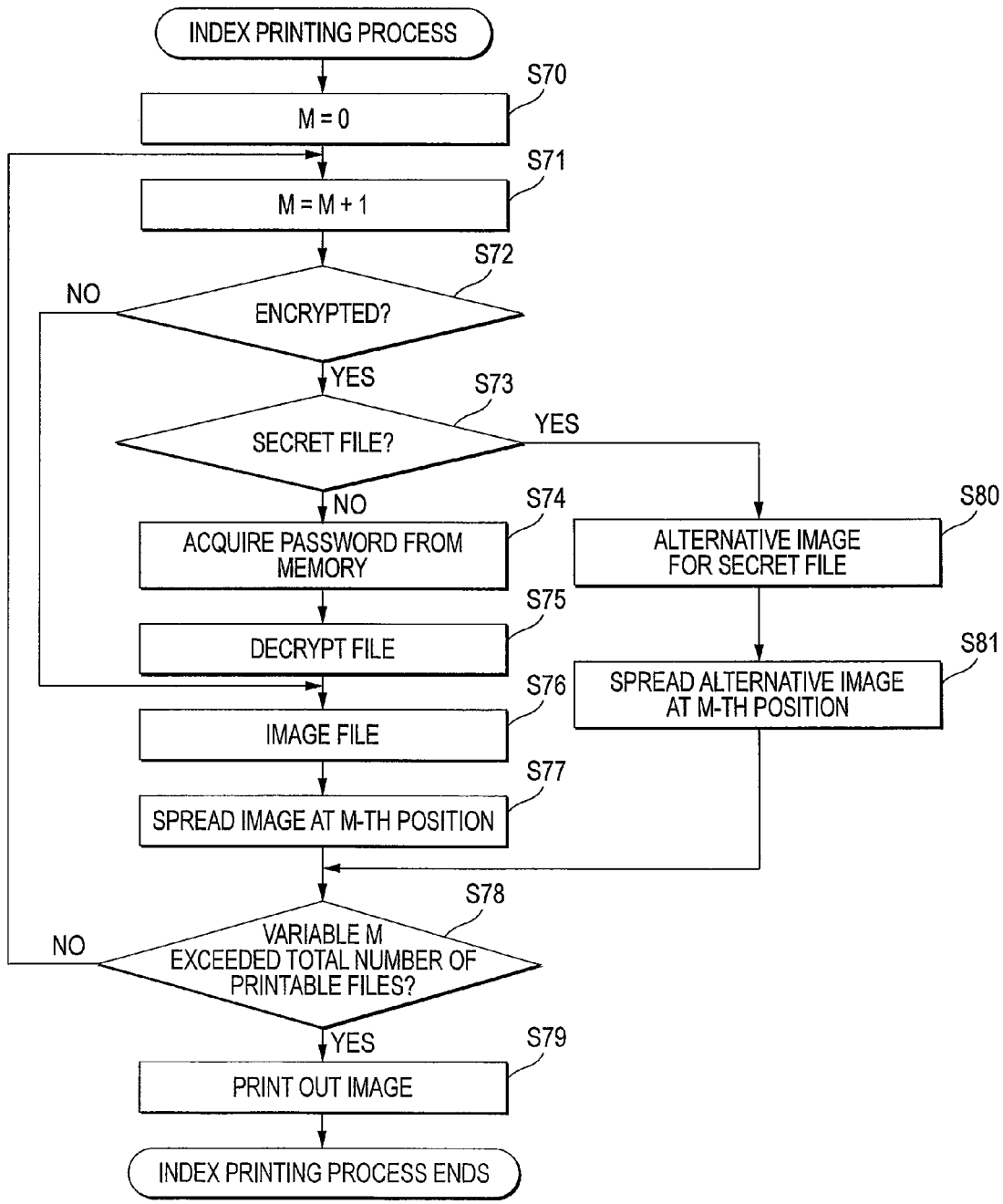
FIG. 13 is a flowchart showing the subroutine of an index printing process according to the first aspect.

FIG. 13 is a flowchart showing the subroutine of the index printing process according to the first aspect.

In the subroutine of the index printing process, an image of files stored in the USB memory 50 is output as an index. If an overall-index-display prohibition flag is not in an ON state at step S31 in the flow of FIG. 7, an image shown in FIG. 8A is output. If an overall-index-display prohibition flag is in an ON state, an image shown in FIG. 8B is output.

First, an index variable used for indexing is initialized at step S70. An index variable M is used in this aspect, and the value of the index variable M is set at 0.

The index variable M is counted up at step S71, and an examination as to whether this is an encrypted file is made at step S72.

If the M-th file in the file management table is an encrypted file (S72: Yes), an examination as to whether this is a secret file is made at step S73. If the M-th file is not an encrypted file (S72: No), the process proceeds to step S76.

If the file is not a secret file at step S73 (S73: No), a password stored in the RAM 23 is read at step S74. If the file is a secret file (S74: Yes), the process proceeds to step S80.

The password is acquired at step S74, and the file is decrypted thereby at step S75.

Thereafter, the file is imaged at step S76, and the process proceeds to step S77 where the image formed at step S76 is spread at the M-th position of index images to be output.

A check as to whether the value of the index variable M exceeds the total number of searched files stored in the file management table is made at step S78. If not (S78: No), the variable is again counted up at step S71.

If the M-th file is not an encrypted file at step S72 (S72: No), the M-th file is an unencrypted file. Hence, the process branches to step S76 where the file is imaged.

If a determination that this is a secret file is made at step S73 (S73: Yes), an alternative image is called and spread at the M-th position of the index images at step S80.

Then checking is performed at step S78. If the value of the index variable M exceeds the total number of the files at step S78 (S78: Yes), an index image produced in the subroutine is printed, thus completing the subroutine of the index printing process.

Next, description will be given of operational advantages in the first aspect.

The invention in the first aspect is the structure of the printer 10 described above. Based on the flow shown in each of FIG. 4 to FIG. 13, file printing or index printing is performed for data of the files F1 to F11 stored in the USB memory 50.

In this case, to protect the data indicating the contents of the files F1 to F11, these files are encrypted by each individual password. Heretofore, each password is required to be input for each file in order to print out these files. However, if the files are encrypted by the same password as in the first aspect of the present invention, printing can be performed in a less troublesome manner without repeatedly inputting passwords.

As described above, in practice, there are not that many passwords that are repeatedly used when a user encrypts files.

Although each individual password should, of course, be used for each file from the viewpoint of security enhancement, there is no advantage to setting passwords if the user has no memory of all of the passwords. However, to increase the effectiveness of a password, in many cases, the password is required to be formed as a six-digit number, an eight-digit number, or an alphanumeric combination. There is also a case in which the password is required to be formed as a number having nine or more digits. Therefore, it is difficult for the user to memorize passwords proportionate to the number of files.

Therefore, normally, the same password is used for a plurality of files. For example, if there are business files that are used in the same division of a company, the same password shared in the division is used for the files. Even in private use, in many cases, the same kind of files are encrypted by using the same password.

According to the first aspect of the present invention, files encrypted by the same password are stored in the USE memory 50, and this USB memory 50 is inserted into the USB port 14 of the printer 10. Thereafter, the password is input by using the input panel 12a. As a result, advantageously, the files encrypted by the same password can be printed out without repeatedly inputting other passwords.

It is certainly tiresome and painful to input the same password whenever files are printed out, thereby lowering working efficiency.

Since the user psychologically wishes to avoid such a time-consuming operation, a decrease in security will be brought about.

However, in the printing apparatus according to the first aspect, the four files encrypted by the password "0001," i.e., the files F1, F2, F6 and F9 among the files stored in the USB memory 50 can be printed out merely by inputting the password once.

Therefore, the user can improve the working efficiency in a less troublesome manner, and can prevent a decrease in security caused by, for example, using unencrypted files so as to avoid a time-consuming operation.

Index printing is effective because an at-a-glance easy recognition can be achieved when the structure of files stored in the USB memory 50 is examined and when the liquid crystal panel display section 13 is not large enough to be seen.

Although description has been given of the ON condition of a flag, showing whether or not the overall index display is prohibited with reference to FIG. 7, the overall index display can be prohibited. This depends on the UBE memory 50. Hence, it is recommended to change the security level according to how the USB memory 50 is operated. A secret file is not displayed by prohibiting the overall index display, and only two kinds of files, i.e., a file that can be decrypted by a user-memorized password and an unencryted file are displayed. Accordingly, a higher security level can be achieved.

As described above, according to the printing apparatus of the first aspect, the following excellent operations and effects are achieved.

(1) The printing apparatus includes the USB port 14 connected to the USB memory 50 so as to read data from the USB memory 50 that can store pieces of data, the input panel 12a used to input a password used to decrypt encrypted data stored in the USB memory 50, the RAM 23 that stores the password input by the input panel 12a, the data decrypting unit (which is realized by the CPU 21 at steps S65, S67 and S75) for decrypting the encrypted data by using the password stored in the RAM 23, the RAM 23 that temporarily stores the encrypted data decrypted by the data decrypting unit and the printer section 31 that prints out the encrypted data decrypted by the data decrypting unit. The thus structured printing apparatus is characterized by further including the redecrypting unit (which is realized by the CPU 21 at step S57) for decrypting other encrypted data stored in the USB memory 50 by using the password used when the data decrypting unit decrypts the encrypted data. Therefore, as a result of the use of the same password stored in the single USB memory 50, a plurality of encrypted data file scan be continuously printed out without again inputting the password, and the time-consuming operation of repeatedly inputting passwords can be eliminated. Thus, usability can be improved.

If a password is set for each individual data file, the data files are encrypted by mutually different passwords, respectively. As a result, the security level is heightened, and desirable data management can be carried out. However, usually, a user uses a large number of data files. If unique passwords are set for the different data files, the user cannot memorize so many passwords.

Therefore, in most cases, the number of passwords used by a single user is two or three. Moreover, the user may use the same password for a plurality of data files.

In these cases, if a plurality of encrypted data files are stored in a storage device and are printed out by a printer in a direct printing mode, the same password must be troublesomely input repeatedly by the number of printing operations. However, if the printer memorizes a password that has been input once, there is no need to repeatedly input the password when a data file having the same password is again printed out, thus usability can be improved.

Concerning security, since a user inserts the USB memory 50 directly into the printer 10 and then inputs a password, security is not lowered even if the password is stored in the RAM 23 of the printer 10, because the password is eliminated at a timing, e.g., when the user leaves the printer 10.

(2) The printing apparatus described in the item (1) is characterized in that the redecrypting unit (which is realized by the CPU 21 at step S57) includes a data retrieving unit (which is realized by the CPU 21 at step S3) for retrieving decryptable encrypted data that can be decrypted by the input password from the files F1 to F11 stored in the USE memory 50, and a retrieved-encrypted-data decrypting unit (which is realized by the CPU 21 at steps S66 and S67) for decrypting decryptable encrypted data that has been retrieved by the data retrieving unit by using the password stored in the RAM 23. Therefore, files that can be printed out can be retrieved on the side of the printer 10, and the user can be informed of data that can be printed out by the input password.

As a result, the user can grasp data that can be printed out.

(3) The printing apparatus described in the item (2) is characterized in that the re-decrypting unit (which is realized by the CPU 21 at step S57) includes a determined-data printing unit (which is realized at step S5) for displaying unencrypted data and the decryptable encrypted data retrieved by the data retrieving unit (which is realized by the CPU 21 at step S3) on the liquid crystal panel display section 13 in a determinable manner and allowing the printer section 31 to print out either the decryptable encrypted data or the unencrypted data as a result of a selection therebetween. Therefore, an easy judgment can be made about how much decryptable data and unencrypted data are stored in the USB memory 50.

Encrypted data that cannot be decrypted by an input password may be displayed as secret data on the liquid crystal panel display section 13 and may be printed out by the printer section 31.

Since the liquid crystal panel display section 13 of the printer 10 has a limited space, an at-a-glance easy recognition can be improved by printing out the data on sheets of paper.

(4) The printing apparatus described in any one of the items (1) to (3) is characterized by further including a data deleting unit (which is realized by the CPU 21 at step S9) for deleting the password stored in the RAM 23 and the encrypted data stored in the RAM 23 decrypted by the data decrypting unit (which is realized by the CPU 21 at steps S65, S67 and S75) and the re-decrypting unit (which is realized by the CPU 21 at step S57) when a connection between the USB memory 50 and the USB port 14 is broken or when a predetermined time elapses after inputting the password. Therefore, a case never occurs in which a password remains in the printer 10 after a user uses the printer 10, so that the password is misused. Therefore, the security level is heightened.

(Second Aspect)

Next, a second aspect will be described.

The structure of the printer 10 and the USB memory 50 are the same as in the first aspect (FIG. 1 to FIG. 3). Herein, description thereof is omitted.

The second aspect differs from the first aspect in the file decrypting process.

This will be described using flowcharts as follows.

Since a main flowchart showing direct printing is the same as that of FIG. 4 in the first aspect, description thereof is omitted.

A first difference from the first aspect resides in the subroutine of the file search process performed at step S3 of FIG. 4.

Figure 14:
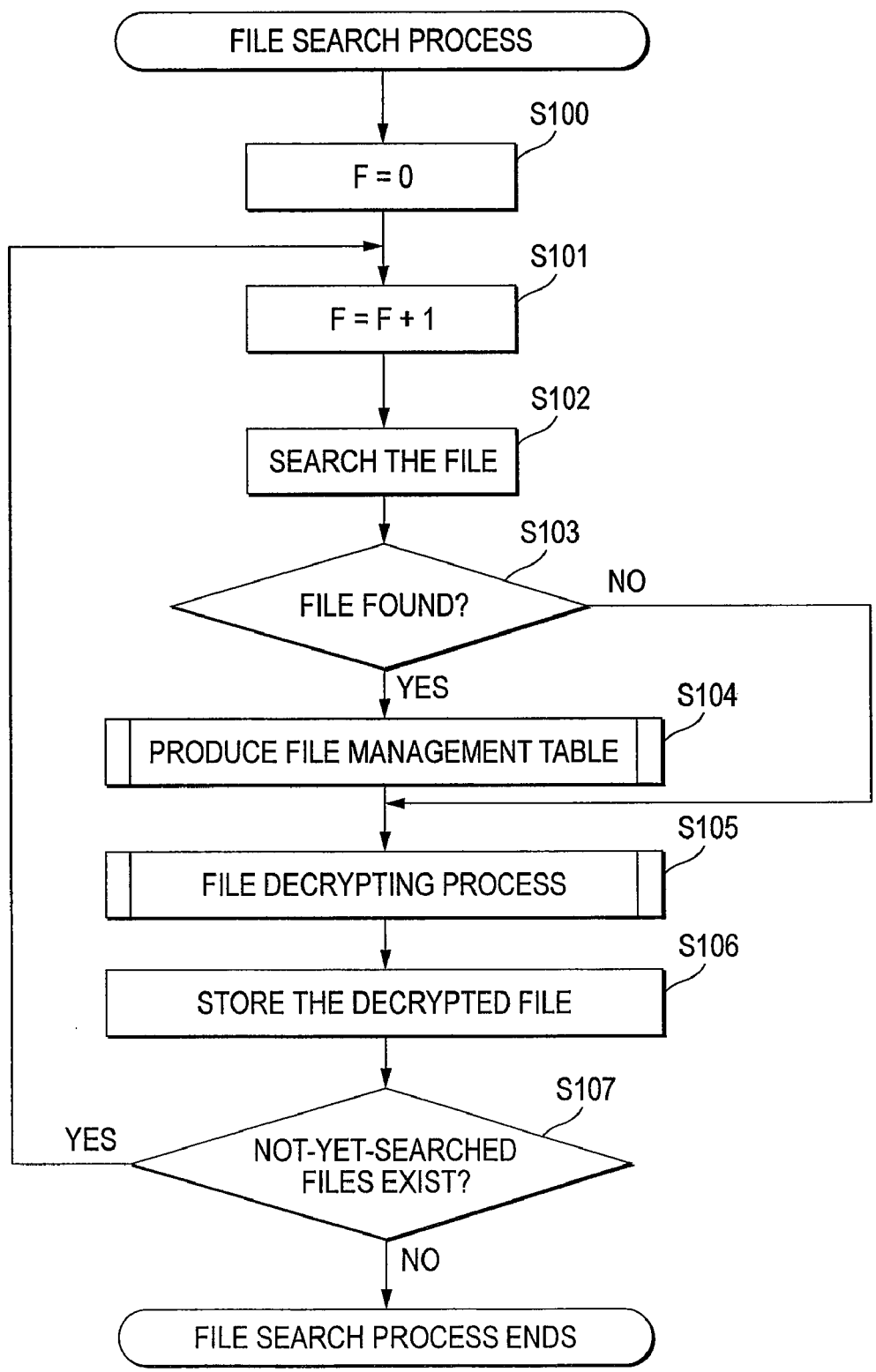
FIG. 14 is a flowchart showing the subroutine of a file search process according to a second aspect of the present invention.

FIG. 14 is a flowchart showing the subroutine of the file search process in the second aspect.

The file search process examines files stored in the USB memory 50 in the same way as in FIG. 6 of the first aspect. However, the second aspect differs from the first aspect in the fact that decryptable files are decrypted at this moment and are stored in the RAM 23.

First, a file search variable F used for a file search is initialized at step S500. The file search variable F is then counted up at step S101.

Files stored in the USB memory 50 are searched at step S102. The files F1 to F11 are stored in the USB memory 50 and are sequentially searched. For example, if the file search variable F is 1, the file F1 is found.

A confirmation of whether any file has been found is made at step S103. Since the file F1 has been found here (S103: Yes), the process skips to the subroutine of the file management table production at step S104.

In the subroutine of the file management table production, the files stored in the USB memory 50 are examined, and the state of these files is recorded in the RAM 23 so that these can be used in other subroutines. Since the subroutine of the file management table production is the same as that of FIG. 7 shown in the first aspect, description thereof is omitted. The files stored in the USB memory 50 are examined to determine whether these are unencrypted files, decryptable files, or secret files. Then, the examination results are stored. The total number of searched files is also examined by numbering the files.

If no file has been found at step S103 (S103: No), the process proceeds to step S105.

The subroutine of the file decrypting process is executed to decrypt decryptable files found above at step S105. The subroutine of the file decrypting process will be later described.

The contents of decrypted files are stored in the RAM 23 at step S106. In this case, let it be supposed that the RAM 23 has a sufficient storage area.

A check whether a not-yet searched file exists is made at step S107. If a not-yet searched file exists, the file search variable F is again counted up at step S101, and the following file is searched.

If a not-yet searched file does not exist at step S107 (S107: No), the file search process is completed.

As described above, in the second aspect, all files stored in the USB memory 50 are searched, and if a decryptable file is found, the encrypted file is decrypted at this moment and is then stored in the RAM 23. For example, if the file search variable F is 1, the file F1 is found. The password for this is "0001," which is the same as that stored therein. Therefore, the file F1 is decrypted at this moment and is then stored in the RAM 23.

Next, description will be given of the subroutine of the file decrypting process performed at step S105 of FIG. 14.

Figure 15:
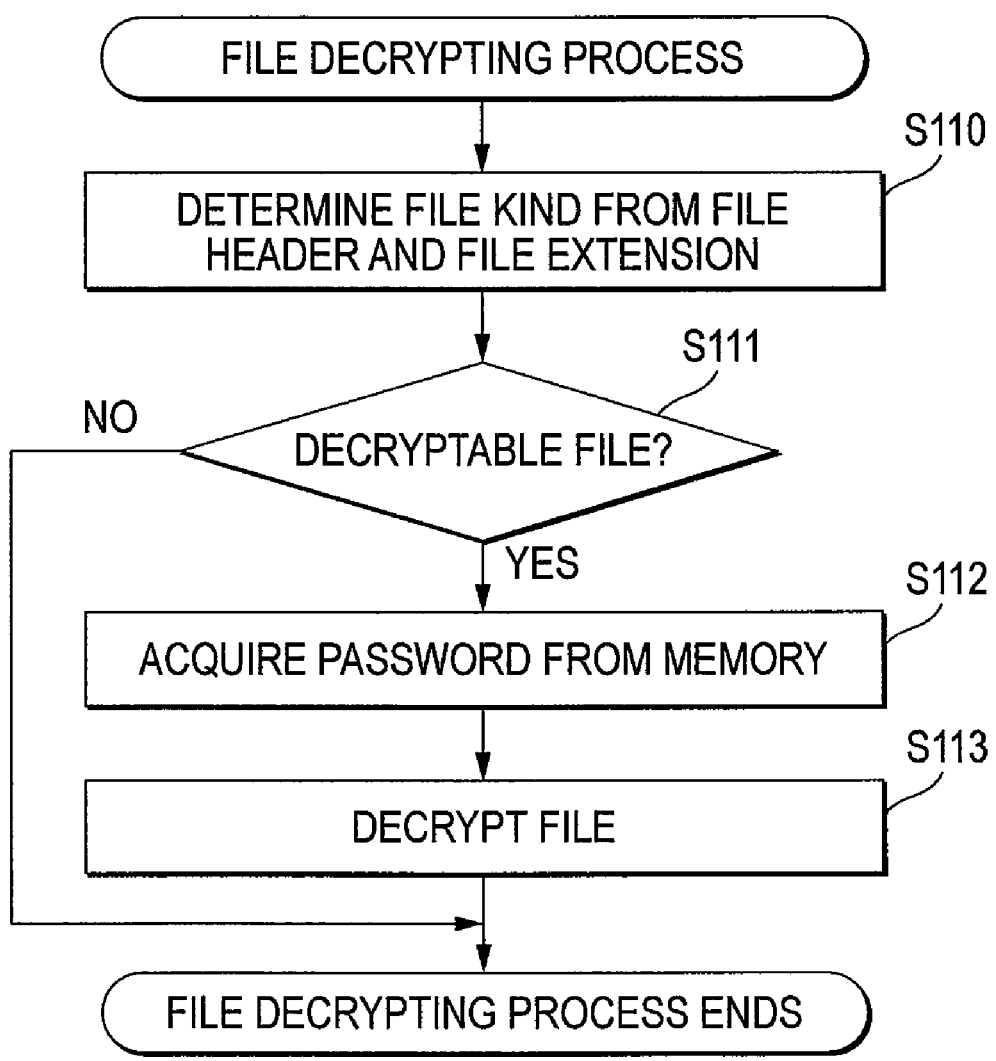
FIG. 15 is a flowchart showing the subroutine of a file decrypting process according to the second aspect.

FIG. 15 is a flowchart showing the subroutine of the file decrypting process according to the second aspect.

In the subroutine of the file decrypting process, all decryptable files searched above are decrypted based on data stored in the RAM 23 by executing the subroutine of the file management table production shown in FIG. 7.

First, the kind of a selected F-th file is determined from a header and an extension of the file at step S110.

Based on information stored in the file management table, a determination as to whether the F-th file is a decryptable file is made at step S111. If the F-th file is a decryptable file (S111: Yes), a password stored in the RAM 23 is read at step S112. If the F-th file is not a decryptable file, the file decrypting process is completed without performing any operations.

After the password is acquired at step S112, the decryptable file is decrypted at step S113 and the file decrypting process is completed.

Then, the decrypted data is stored in the RAM 23 at step S106.

Thus, all files that have been determined to be decryptable files in the subroutine of the file management table production are decrypted by allowing the subroutine of the file decrypting process to operate in the subroutine of the file search process shown in FIG. 14.

The four files F1, F2, F6 and F9, which are decryptable files to be decrypted by the stored password "10001," are stored in the USB memory 50. All of these four files are decrypted by executing the subroutine of the file search process shown in FIG. 14 and are stored in the form of decrypted data in the RAM 23.

The process then proceeds to the printing process performed at step S5 of the direct printing process of FIG. 4.

Since the subroutine of the printing process is the same as that of the first aspect shown in FIG. 9, description thereof is omitted. At this moment, a selection is made between the file printing process and the index printing process.

Since this subroutine of the file printing process and this subroutine of the index printing process differ from those of the first aspect, these differences will be described.

First, description will be given of the subroutine of the file printing process performed at step S46 of FIG. 9.

Figure 16:
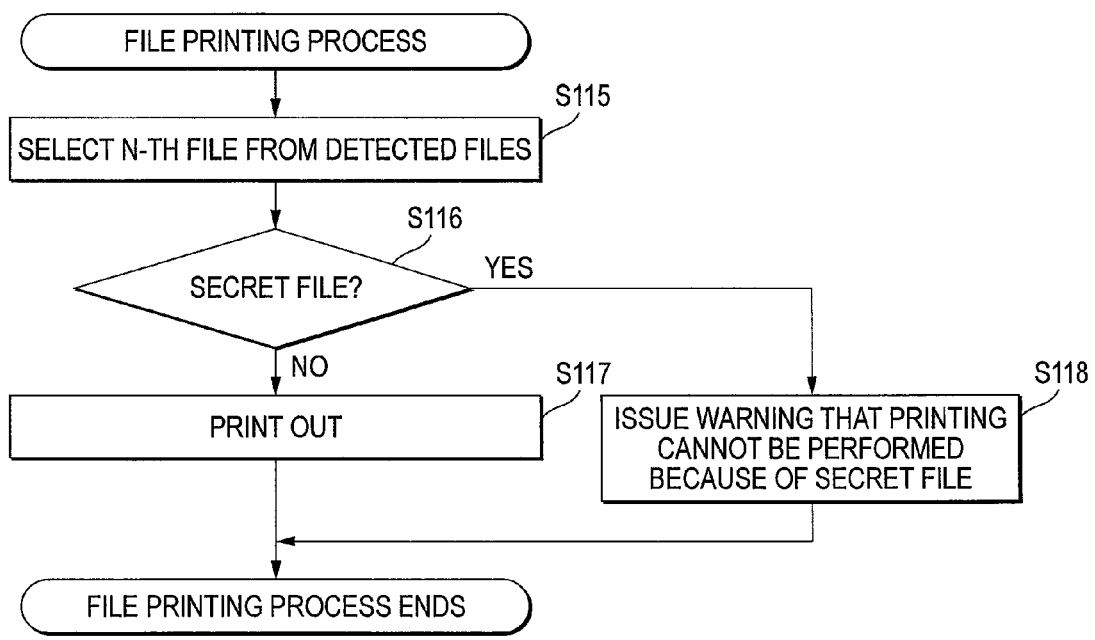
FIG. 16 is a flowchart showing the subroutine of a file printing process according to the second aspect.

FIG. 16 is a flowchart of the subroutine of the file printing process according to the second aspect.

In the subroutine of the file printing process, selected files are printed out in the same way as in the first aspect. However, since the decrypting operation has already been completed, there is no need to decrypt the files in this routine.

First, an N-th file stored in the file management table is selected at step S115. Since the printing variable N is determined by allowing a user to operate the operating section 12b at step S41 of FIG. 9, the file is selected according to the value of the printing variable N determined thereby.

For sake of simplicity, let it be supposed that the printing variable N is 2 here. It the printing variable N is 2, the file F2 is selected.

An examination as to whether the file selected at step S116 is a secret file is made. Herein, the file is determined not to be a secret file (S16: No), because the file F2 is recorded as a decryptable file in the file management table.

The N-th file stored in the file management table is printed out at step S117. Since the printing variable N is set at 2 as described above, the file F2 is printed out here.

On the other hand, if the selected n-th file is determined to be a secret file at step S116 (S116: Yes), the warning that printing cannot be performed because of a secret file is issued at step S118, and the file printing process is completed.

It is permissible to employ a flow in which the password is again inquired. If this is agreeable, printing can be performed at step S118.

Thus, there is a difference in the routine between the file printing process of the first aspect shown in FIG. 11 and the file printing process shown in FIG. 16, depending on whether a decryptable file is decrypted beforehand and stored in the RAM 23.

Next, description will be given of the subroutine of the index printing process.

Figure 17:
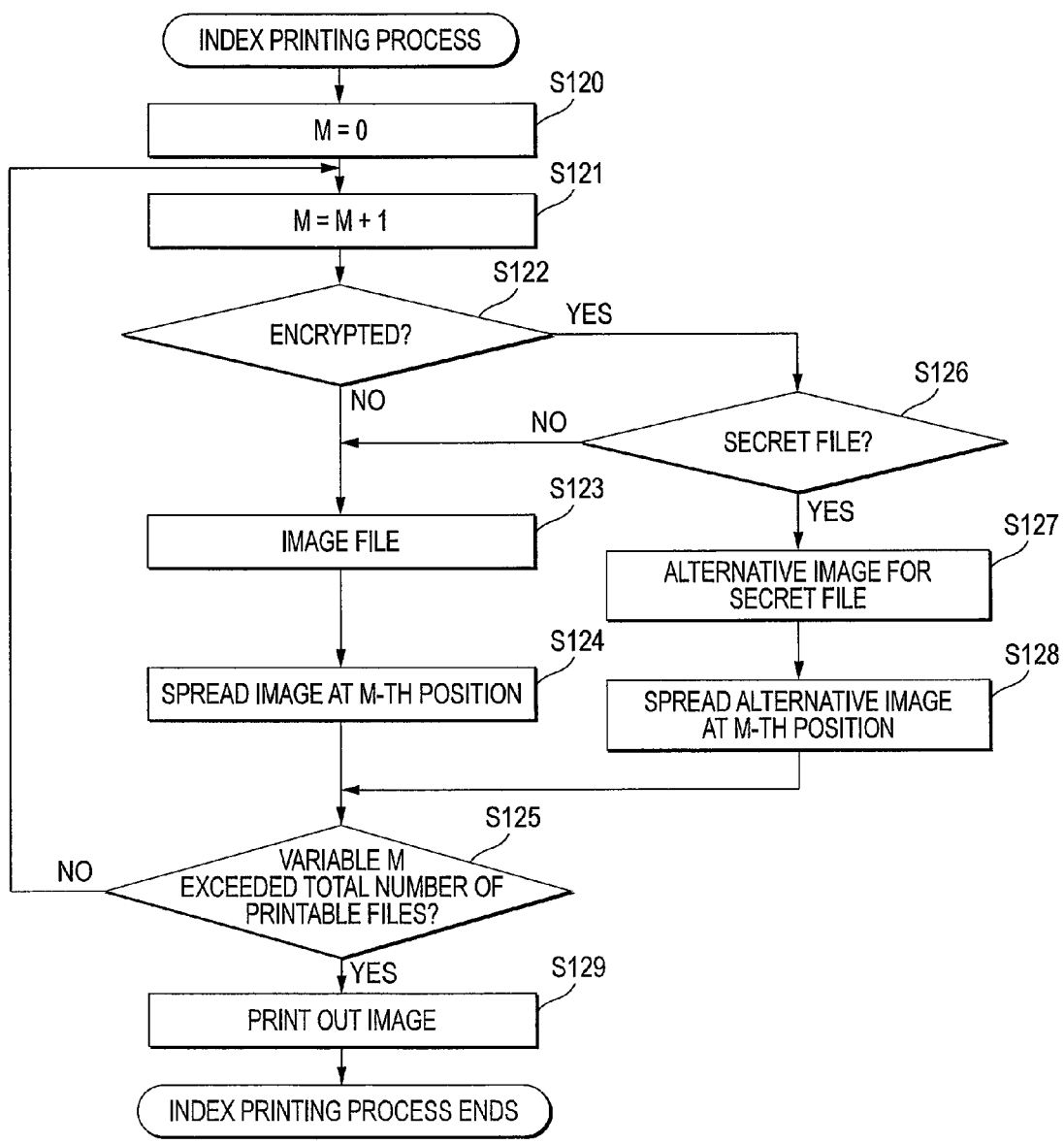
FIG. 17 is a flowchart showing the subroutine of an index printing process according to the second aspect.

FIG. 17 is a flowchart of the subroutine of the index printing process according to the second aspect.

In the subroutine of the index printing process, an image of files stored in the USB memory 50 is output as an index. If an overall-index-display prohibition flag is not in an ON state at step S31 in the flow of FIG. 7, an image shown in FIG. 8A is output. If an overall-index-display prohibition flag is in an ON state, an image shown in FIG. 8B is output. Although this is the same as in the first aspect, a partial difference in the flow exists between this aspect and the first aspect.

First, the index variable used for indexes is initialized at step S120. Herein, the index variable M is set at 0.

The index variable M is counted up at step S121, and an examination as to whether the file is an encrypted file is made at step S122.

If the M-th file of the file management table is an encrypted file (S122: Yes), an examination as to whether this is a secret file is made at step S126. If the M-th file is not an encrypted file, the process proceeds to step S123.

If the file is a secret file at step S126 (S126: Yes), an alternative image is read for the secret file at step S127. The alternative image spreads at the M-th position of the image files at step S128.

On the other hand, if the file is not a secret file at step S126 (S126: No), the file is stored as a decryptable file in the file management table. Since the file has already been decrypted at step S113 of FIG. 15, a corresponding file is read from the RAM 23 and is imaged at step S123.

The M-th file selected above has been determined to be an unencrypted file or a decryptable file, and the selected M-th file is imaged at step S123. Since the decryptable file has already been decrypted and stored in the RAM 23 as described above, there is no need to decrypt this when imaged.

The image spreads at the M-th position of the image files at step S124.

A determination as to whether the value of the index variable X exceeds the total number of searched files stored in the RAM 23 is made at step S125. If not (S125: No), the process proceeds to step S121. If the value of the index variable M exceeds the total number of searched files (S125: Yes), the image file is printed out at step S129, and the subroutine of the index printing process is completed.

Thus, a difference in the routine exists between the index printing process of the first aspect shown in FIG. 12 and the index printing process shown in FIG. 17, depending on whether the decryptable file is beforehand decrypted and stored in the RAM 23.

Next, the operational advantages of the second aspect will be described.

The invention in the second aspect is the structure of the printer 1 described above. Based on the flow shown in FIG. 14 to FIG. 17 and the flow shown in FIG. 4, FIG. 5 and FIG. 7, which is the same as in the first aspect, data of the files F1 to F11 stored in the USB memory 50 are selectively printed out in the form of file printing or index printing.

Although the files F1 to F11 are respectively encrypted by individually corresponding passwords at this time in order to protect the data indicating the contents of the files, the invention in the second aspect enables the files encrypted by the same password to be printed out in the same way as in the first aspect without the time-consuming operation of repeatedly inputting the password.

The second aspect greatly differs from the first aspect in the fact that decryptable files are decrypted beforehand and stored in the RAM 23 in the subroutine of the file search process shown in FIG. 14.

This process makes it unnecessary to decrypt files when printed out. Hence, although more time is taken during the file search process than during that of the first aspect shown in FIG. 6, this process can be advantageously performed in less time.

If the RAM 23 has a sufficient storage space, the files can be processed in less time at the subsequent steps by beforehand decrypting the files as described above. Therefore, advantageously, there is no need to decrypt each individual file one by one, for example, when a large number of files are printed out.

Therefore, since printing can be carried out more swiftly, working efficiency can be improved. Moreover, it is possible to avoid a decrease in security which is caused by using files without encryption so as to avoid a time-consuming operation, for example.

Data stored in the RAM 23 are not lowered in security level because the data are deleted so that the password and the data do not remain in the printer when the direct printing process is quitted at step S9 of FIG. 4.

As described above, according to the printing apparatus of the second aspect, the following excellent operations and effects are achieved.

(1) The printing apparatus includes the USB port 14 connected to the USB memory 50 so as to read data from the USB memory 50 that can store pieces of data, the input panel 12a used to input a password used to decrypt encrypted data stored in the USB memory 50, the RAM 23 that stores the password input by the input panel 12a, the data decrypting unit (which is realized by the CPU 21 at step S113) for decrypting the encrypted data by using the password stored in the RAM 23, the RAM 23 that temporarily stores the encrypted data decrypted by the data decrypting unit, and the printer section 31 that prints out the encrypted data decrypted by the data decrypting unit. The thus structured printing apparatus is characterized by further including the re-decrypting unit (which is realized by the CPU 21 at step S105) for decrypting other encrypted data stored in the USB memory 50 by using the password used when the data decrypting unit decrypts the encrypted data. Therefore, the files F1 to F11 encrypted by using the same password stored in the single USB memory 50 can be continuously printed out without again inputting the password, and the time-consuming operation of repeatedly inputting passwords can be eliminated, thus usability can be improved.

If a password is set for each individual data file, the data files are encrypted by mutually different passwords, respectively. As a result, the security level is heightened, and desirable data management can be carried out. However, usually, a user uses a large number of data files. If unique passwords are set for the different data files, the user cannot memorize so many passwords.

Therefore, in most cases, the number of passwords used by a single user is two or three. Moreover, the user may use the same password for a plurality of data files.

In these cases, if data such as those of the files F1 to F11 are stored in the USB memory 50 and are printed out by the printer 10 in a direct printing mode, the same password must be troublesomely input repeatedly by the number of printing operations. However, if the printer 10 memorizes a password that has been input once, there is no need to repeatedly input the password when a data file having the same password is again printed out, thus usability can be improved.

Concerning security, since a user inserts the USB memory 50 directly into the printer 10 and then inputs a password, security is not lowered even if the password is stored in the printer 10, because the password is eliminated at a timing, e.g., when the user leaves the printer 10.

(2) The printing apparatus described in the item (1) is characterized in that the re-decrypting unit (which is realized by the CPU 21 at step S105) includes a data retrieving unit (which is realized by the CPU 21 at step S3) for retrieving decryptable encrypted data that can be decrypted by the input password from the files F1 to F11 stored in the USB memory 50, and a retrieved-encrypted-data decrypting unit (which is realized by the CPU 21 at steps S104, S105 and 107) for decrypting decryptable encrypted data that has been retrieved by the data retrieving unit by using the password stored in the RAM 23. Therefore, files that can be printed out can be retrieved on the side of the printer 10, and the user can be informed of data that can be printed out by the input password.

As a result, the user can grasp data that can be printed out.

(3) The printing apparatus described in the item (1) is characterized in that the re-decrypting unit (which is realized by the CPU 21 at step S105) includes a data retrieving unit (which is realized by the CPU 21 at step S3) for retrieving decryptable encrypted data that can be decrypted by an input password from the files F1 to F11 stored in the USB memory 50, a retrieved data decrypting unit (which is realized by the CPU 21 at step S105) for decrypting the retrieved decryptable encrypted data by using the password stored in the RAM 23, and a retrieved and decrypted data storing unit (which is realized by the RAM 23 at step S106) for storing the decrypted data decrypted by the retrieved data decrypting unit. Therefore, when a user prints out files, if a password is first input, printing can be performed without time loss thereafter.

(4) The printing apparatus described in the item (2) or (3) is characterized in that the re-decrypting unit (which is realized by the CPU 21 at step S105) includes a determined-data printing unit (which is realized at step S5) for displaying unencrypted data and the decryptable encrypted data retrieved by the data retrieving unit (which is realized by the CPU 21 at step S3) on the liquid crystal panel display section 13 in a determinable manner and allowing the printer section 31 to print out either the decryptable encrypted data or the unencrypted data as a result of a selection therebetween. Therefore, an easy judgment can be made about how much decryptable data and unencrypted data are stored in the USE memory 50.

Encrypted data that cannot be decrypted by an input password may be displayed on the liquid crystal panel display section 13, and may be printed out by the printer section 31.

Since the liquid crystal panel display section 13 of the printer 10 has a limited space, an at-a-glance easy recognition can be improved by printing out the data.

(5) The printing apparatus described in any one of the items (1) to (4) is characterized by further including a data deleting unit (which is realized by the CPU 21 at step S9) for deleting the password stored in the RAM 23 and the encrypted data stored in the RAM 23 decrypted by the data decrypting unit (which is realized by the CPU 21 at step S113) and the re-decrypting unit (which is realized by the CPU 21 at step S105) when a connection between the USB memory 50 and the USB port 14 is broken or when a predetermined time elapses after inputting the password. Therefore, a case never occurs in which a password remains in the printer 10 after a user uses the printer 10, so that the password is misused. Therefore, the security level is heightened.

(Third Aspect)

Next, the structure of a third aspect will be described.

The structure of the printer 10 and the USB memory 50 are the same as in the first aspect (FIG. 1 to FIG. 3). Herein, description thereof is omitted.

A difference between the third aspect and the first aspect lies in whether a file management table is produced. A file management table is produced in the first aspect, whereas a file management table is not produced in the third aspect.

Figure 18:
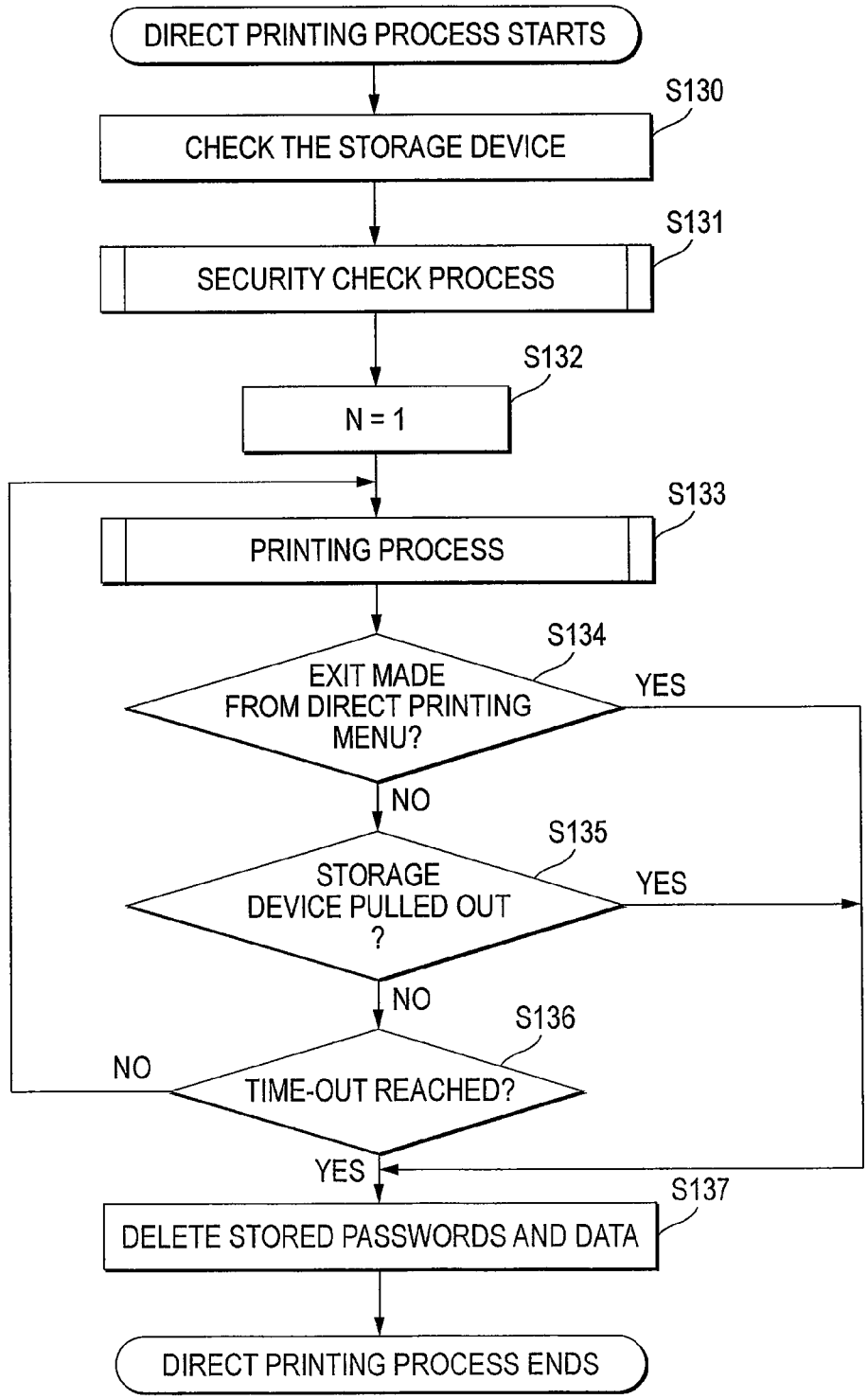
FIG. 18 is a flowchart showing the routine of a direct printing process according to a third aspect of the present invention.

Therefore, FIG. 18 corresponds to FIG. 4 that is a main flow.

FIG. 18 is a flowchart showing the routine of the direct printing process that is a main flow in the third aspect.

In the third aspect, the flow of the direct printing process is almost the same as in the first aspect. However, the subroutine of the file search process performed at step S3 of FIG. 4 is not executed in FIG. 18. The subroutine of the security check process is executed at step S131. Then, the printing variable N is initialized at step S132.

This point is a part differing from the first aspect. Steps subsequent to this point follow the same flow. Hence, description thereof is omitted.

Figure 19:
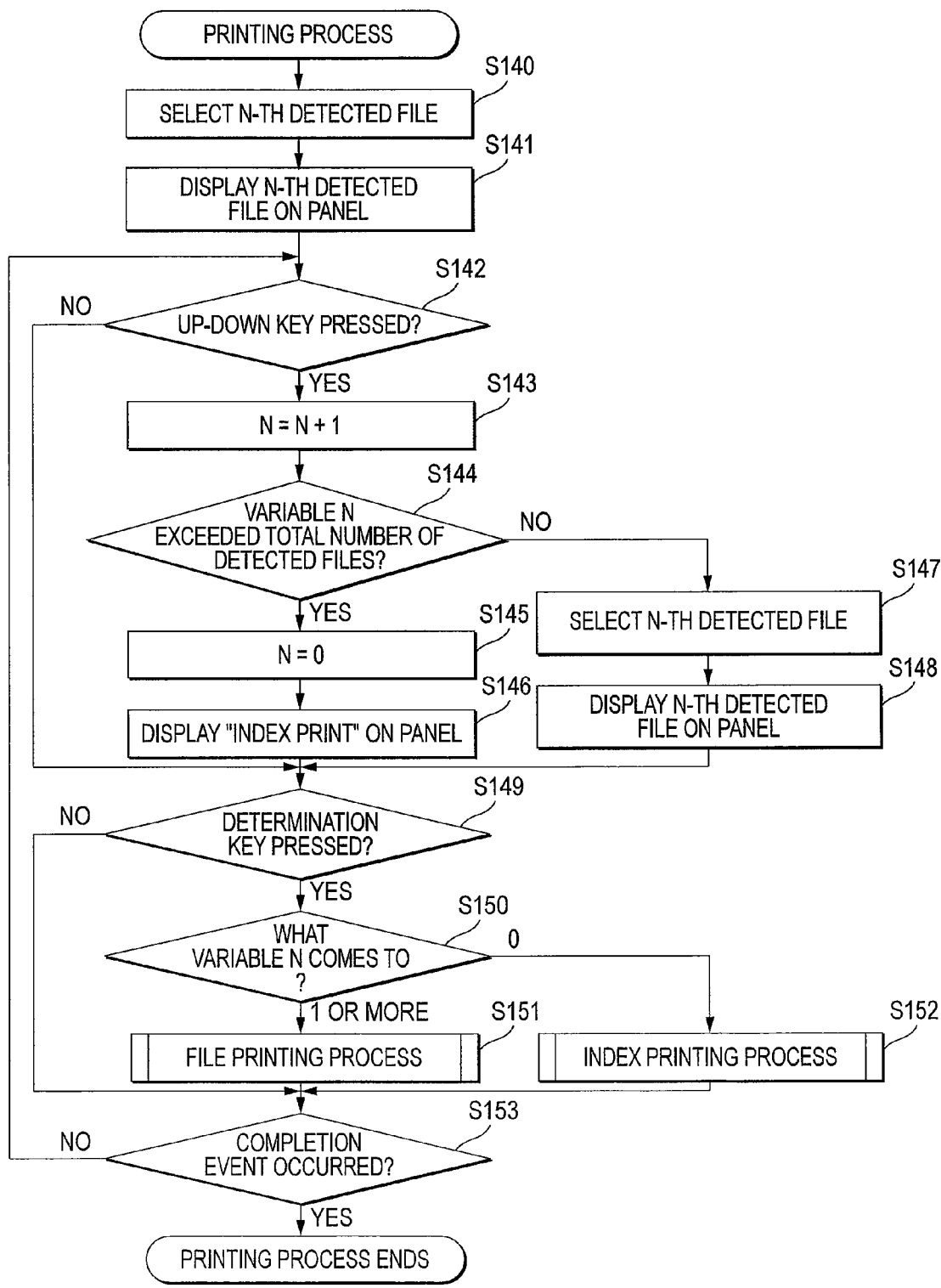
FIG. 19 is a flowchart showing the subroutine of a file search process according to the third aspect.

The flow of the subroutine of the printing process performed at step S133 is that of FIG. 19.

Next, description will be given of the subroutine of the printing process performed at step S133 of FIG. 18.

FIG. 19 is a flowchart showing the subroutine of the printing process of the third aspect.

Although this printing process is almost the same as that of FIG. 9 in the first aspect, a file management table is not beforehand produced in the third aspect. Therefore, when the subroutine of the printing process is started, an N-th searched file is selected at first at step S140.

Since a process for variables that is performed at step S140 is the same as that performed at step S41 of FIG. 9, description thereof is omitted. However, since no file management table is provided here, a file name is confirmed by accessing the USB memory 50.

Thereafter, the N-th file stored in the USB memory 50 is detected at step S141 and is displayed on the liquid crystal panel display section 13.

Likewise, the N-th file is searched directly from the USB memory 50 and is selected and displayed thereon at step S147 and step S148.

Thereafter, step S142, which corresponds to step S43, follows the same flow as in the first aspect. Thus, description thereof is omitted.

Figure 20:
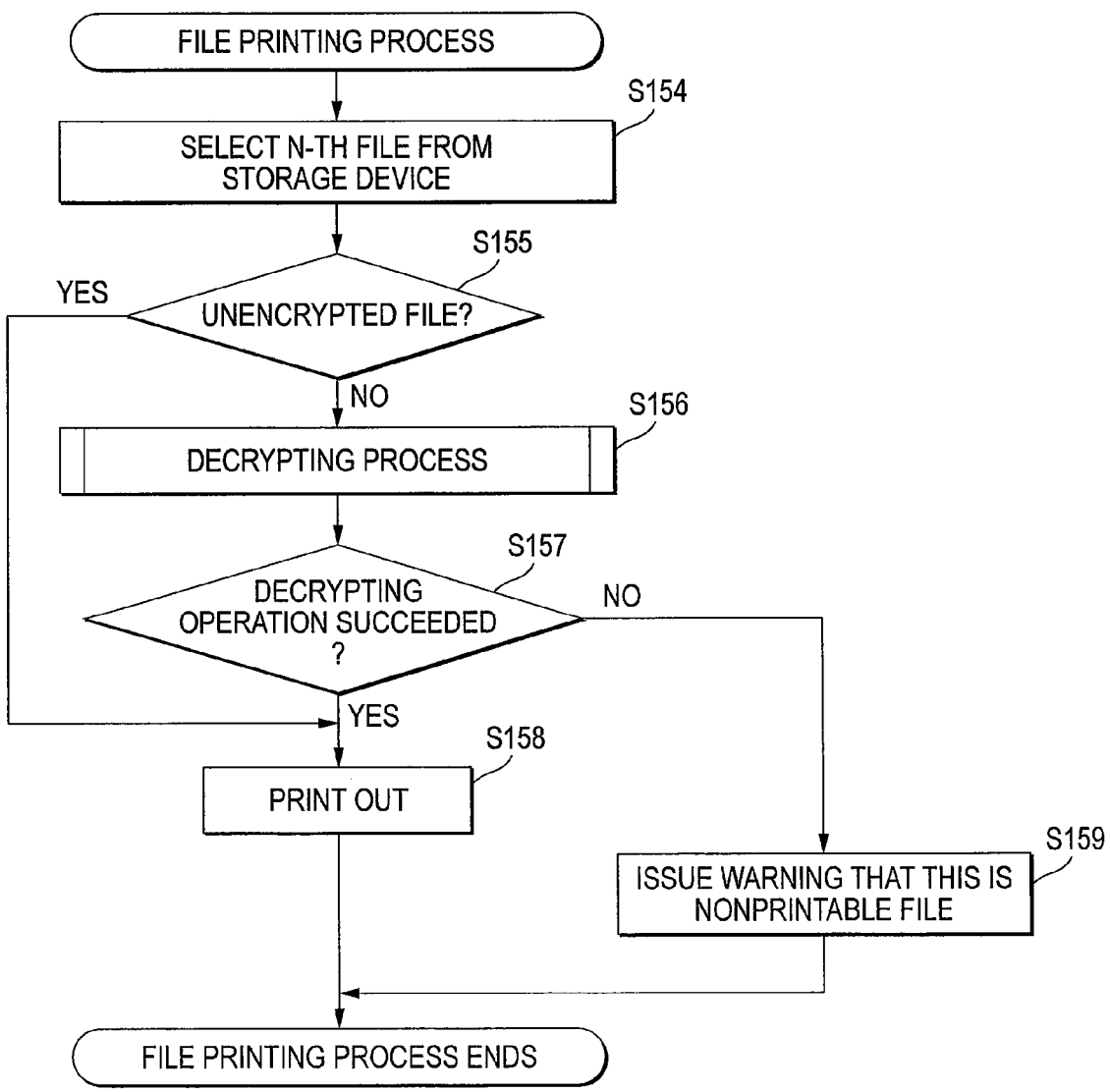
FIG. 20 is a flowchart showing the subroutine of a file printing process according to the third aspect.

The subroutine of the file printing process performed at step S151 follows the flow shown in FIG. 20. The subroutine of the index printing process performed at step S152 follows the flow shown in FIG. 21.

Next, description will be given of the subroutine of the file printing process performed at step S151 of FIG. 19.

FIG. 20 is a flowchart showing the subroutine of the file printing process in the third aspect.

Although the subroutine of the file printing process is almost the same as that of FIG. 11 in the first aspect, a file management table is not beforehand produced in the third aspect. Therefore, step S154 corresponding to step S55 is expressed in a different manner.

That is, the USB memory 50, not the file management table, is searched at step S154, and the N-th file is directly selected.

The N-th file selected from the USB memory 50 is temporarily read into the RAM 23, and an examination as to whether this is an unencrypted file is made at step S155. If this is not an unencrypted file (S155: No), the subroutine of the decrypting process is executed at step S156. This subroutine of the decrypting process is the same as in the first aspect. See the flow of FIG. 12.

If a determination that this is an unencrypted file is made at step S155, the process proceeds to step S158.

Thereafter, step S156, which corresponds to step S57, and step S158, which corresponds to step S59, follow the same flow as in the first aspect. Hence, description thereof is omitted.

Next, description will be given of the subroutine of the index printing process performed at step S152 of FIG. 19.

Figure 21:
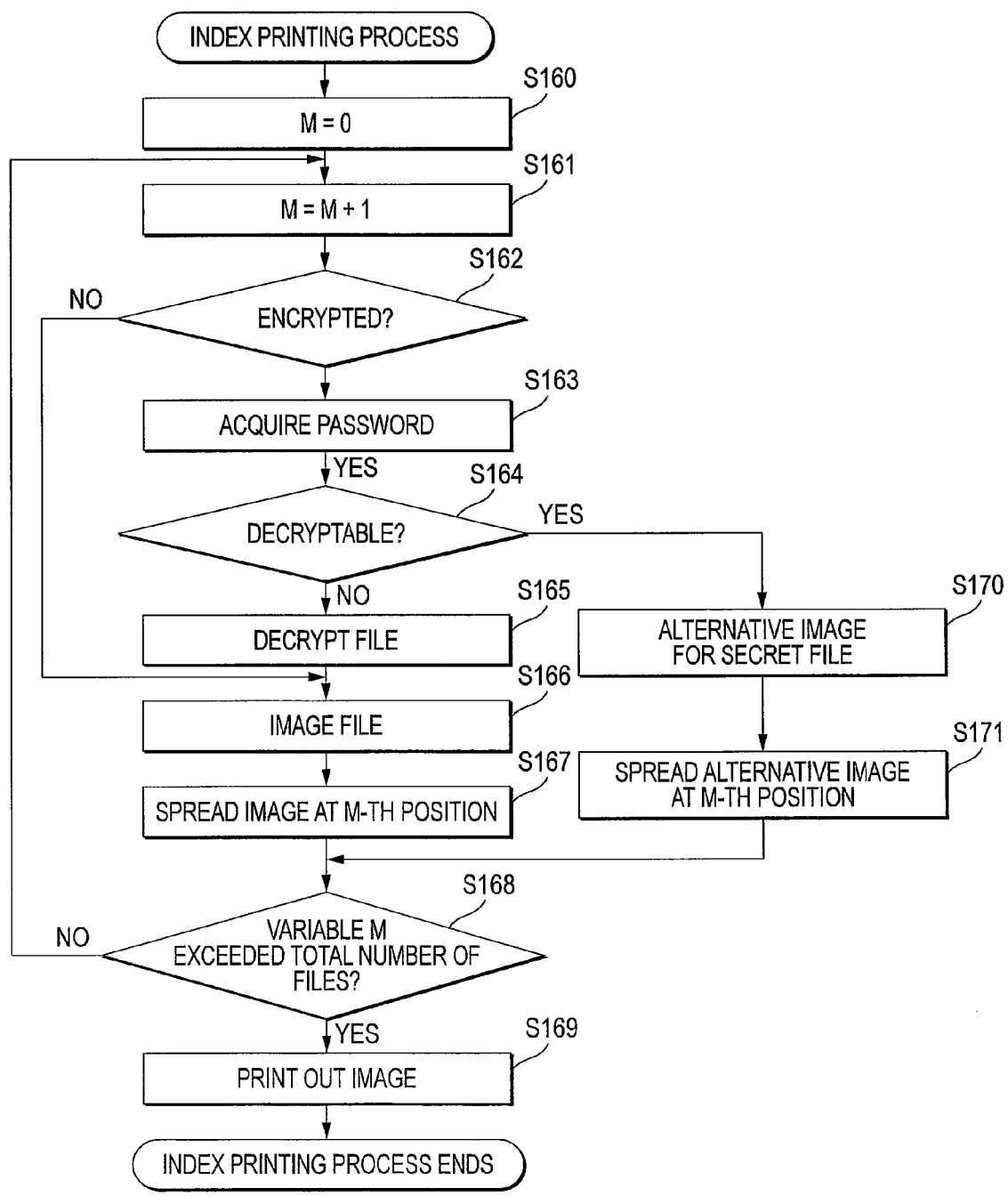
FIG. 21 is a flowchart showing the subroutine of an index printing process according to the third aspect.

FIG. 21 is a flowchart showing the subroutine of the index printing process in the third aspect.

Although this subroutine of the index printing process is almost the same as that of FIG. 13 in the first aspect, a file management table is not beforehand produced in the third aspect. Hence, the contents of steps S72 to S75 of FIG. 13 are replaced by those of steps S162 to S165 of FIG. 21. Furthermore, step S168 corresponding to step S78 is expressed in a different manner.

That is, the M-th file among files stored in the USB memory 50 is temporarily read into the RAM 23, and an examination as to whether this is an encrypted file is made at step S162. If this is not an encrypted file (S162: No), the process proceeds to step S166.

If a determination that this is an encrypted file is made at step S162 (S162: Yes), a password is acquired from the RAM 23 at step S163.

If the M-th file read therefrom can be decrypted by the acquired password at step S164 (S164: Yes), the file is decrypted at step S165. If the M-th file cannot be decrypted thereby, the process proceeds to step S170.

Thereafter, step S166, which corresponds to step S76, and step S170, which corresponds to step S80, follow the same flow as in the first aspect. Hence, description thereof is omitted.

The reason why step S168 differs in expression from step S78 is that the total number of files stored in the USB memory 50 is checked at this point because of being provided with no file management table.

Next, the operational advantage of the third aspect will be described.

The invention in the third aspect is the structure of the printer 10 described above. Based on the flow shown in FIG. 18 to FIG. 21 and the flow shown in FIG. 5 and FIG. 12, which is the same as in the first aspect, data of the files F1 to F11 stored in the USB memory 50 are selectively printed out in the form of file printing or index printing.

Although the files F1 to F11 are respectively encrypted by individually corresponding passwords at this time in order to protect the data indicating the contents of the files, the invention in the third aspect enables the files encrypted by the same password to be printed out in the same way as in the first aspect without the time-consuming operation of repeatedly inputting the password.

The third aspect greatly differs from the first aspect in the fact that, as can be understood from a comparison between FIG. 18 and FIG. 4, the subroutine of the file search process is not executed, and a file management table, which is produced here, is not provided.

When files are searched, there is a need to directly access the USB memory 50 because of being provided with no file management table as described above. However, no production of such a file management table makes it possible to shorten time from when the USB memory 50 is set in the printer 10 until when printing is started.

Additionally, because of being provided with no file management table, spatial pressure against the RAM 23 is reduced even if the RAM 23 does not have a sufficient storage space. Therefore, the occurrence of memory storage, for example, can be prevented.

Since a time from when the USB memory 50 is set in the printer 10 until printing is started is short as described above, the CPU 21 and the RAM 23 of the printer 10 can be made at low cost. Additionally, advantageously, printing can be performed in less time if the USB memory 50 stores only a little amount of data.

As described above, according to the printing apparatus of the third aspect, the following excellent operations and effects are achieved.

(1) The printing apparatus includes the USB port 14 connected to the USB memory 50 so as to read data from the USB memory 50 that can store pieces of data, the input panel 12a used to input a password used to decrypt encrypted data stored in the USB memory 50, the RAM 23 that stores the password input by the input panel 12a, the data decrypting unit (which is realized by the CPU 21 at steps S156 and S165) for decrypting the encrypted data by using the password stored in the RAM 23, the RAM 23 that temporarily stores the encrypted data decrypted by the data decrypting unit, and the printer section 31 that prints out the encrypted data decrypted by the data decrypting unit. The thus structured printing apparatus is characterized by further including the re-decrypting unit (which is realized by the CPU 21 at step S156) for decrypting other encrypted data stored in the USB memory 50 by using the password used when the data decrypting unit decrypts the encrypted data. Therefore, a plurality of data files encrypted by using the same password stored in the single USB memory 50 can be continuously printed out without again inputting the password, and the time-consuming operation of repeatedly inputting passwords can be eliminated, thus usability can be improved.

If a password is set for each individual data file, the data files are encrypted by mutually different passwords, respectively. As a result, the security level is heightened, and desirable data management can be carried out. However, usually, a user uses a large number of data files. If unique passwords are set for the different data files, the user cannot memorize so many passwords.

Therefore, in most cases, the number of passwords used by a single user is two or three. Moreover, the user may use the same password for a plurality of data files.

In these cases, if data, such as those of the files F1 to F11, are stored in the USB memory 50, and are printed out by the printer 10 in a direct printing mode, the same password must be troublesomely input repeatedly by the number of printing operations. However, it the printer 10 memorizes a password that has been input once, there is no need to repeatedly input the password when a data file having the same password is again printed out, thus usability can be improved.

Concerning security, since a user inserts the USB memory 50 directly into the printer and then inputs a password to use the printer, security is not lowered even if the password is stored in the printer 10, because the password is eliminated at a timing, e.g., when the user leaves the printer 10.

(2) The printing apparatus described in the item (1) is characterized by further including a data deleting unit (which is realized by the CPU 21 at step S9) for deleting the password stored in the RAM 23 and the encrypted data stored in the RAM 23 decrypted by the data decrypting unit (which is realized by the CPU 21 at steps S156 and S165) and the re-decrypting unit (which is realized by the CPU 21 at step S156) when a connection between the USB memory 50 and the USB port 14 is broken or when a predetermined time elapses after inputting the password.

Therefore, a case never occurs in which a password remains in the printer 10 after a user uses the printer 10, so that the password is misused. Therefore, the security level is heightened.

The present invention is not limited to the above aspects. Various modifications can be embodied without departing from the scope of the present invention.

For example, in the first, second and third aspects, an inquiry may be made to a user about what to select when the USB memory 50 is set in the printer 10. This selection may be made in accordance with an operational state or a set value.

Additionally, each flowchart shown in the aspects is, of course, an example. Therefore, the contents of a subroutine, as well as the timing or the operational manner of variables, may be changed within the scope of the design concept of the present invention.

Additionally, although the first to third aspects have described the password input into the input panel 12a as only one password stored in the password storage area formed in the RAM 23, a plurality of passwords may be input from the input panel 12a so that a data file can be decrypted by a selected one of the passwords.

Additionally, although a decrypted file is used in the print function, the file may be used in the copy function, or may be faxed by performing the fax function.

Additionally, a medium, such as a SmartMedia (registered trademark), a CompactFlash®, or an HDD card, which can be used as a storage and which can be recognized by a printing apparatus, may be employed instead of the USB memory 50.

As a matter of course, the USB memory 50 may be recognized through a USB hub connected to a USB port of a printing apparatus. The mediums described above may be recognized through a media reader.

Further, according to another aspect of the invention, in the printing apparatus, the re-decrypting unit includes: a data retrieving unit that retrieves decryptable encrypted data from the pieces of data stored in the storage device, the decryptable encrypted data being decryptable by the input password; and a retrieved encrypted data decrypting unit that decrypts the retrieved decryptable encrypted data by using the stored password.

According to still another aspect of the invention, the printing apparatus further comprises a print engine that prints data, wherein the re-decrypting unit further includes: a determined-data printing unit that displays unencrypted data and the retrieved decryptable encrypted data on a display unit and controls the print engine to print out either the decryptable encrypted data or the unencrypted data as a result of a selection made from the decryptable encrypted data and the unencrypted data.

According to still another aspect of the invention, in the printing apparatus, the re-decrypting unit includes: a data retrieving unit that retrieves decryptable encrypted data from the pieces of data stored in the storage device, the decryptable encrypted data being decryptable by the input password; and a retrieved data decrypting unit that decrypts the retrieved decryptable encrypted data by using the stored password; and a retrieved and decrypted data storing unit that stores the decrypted data decrypted by the retrieved data decrypting unit.

According to still another aspect of the invention, the printing apparatus further comprises a print engine that prints data, wherein the re-decrypting unit further includes: a determined-data printing unit that displays unencrypted data and the retrieved decryptable encrypted data on a display unit and controls the print engine to print out either the decryptable encrypted data or the unencrypted data as a result of a selection made from the decryptable encrypted data and the unencrypted data.

According to still another aspect of the invention, the printing apparatus further comprises a data deleting unit that deletes the stored password from the password storing unit and deletes the decrypted data from the decrypted data storing unit.

According to still another aspect of the invention, in the printing apparatus, the data deleting unit deletes the stored password and the decrypted data when a connection between the storage device and the data reading unit is disconnected.

According to still another aspect of the invention, in the printing apparatus, the data deleting unit deletes the stored password and the decrypted data when a predetermined time elapses after inputting the password.

According to still another aspect of the invention, in the printing apparatus, the stored password used by the re-decrypting unit is the same as the password used by the data decrypting unit.

According to still another aspect of the invention, the printing apparatus further comprises a data deleting unit that deletes the stored password from the password storing unit and deletes the decrypted data from the decrypted data storing unit.

According to still another aspect of the invention, in the printing apparatus, the data deleting unit deletes the stored password and the decrypted data when a connection between the storage device and the data reading unit is disconnected.

According to still another aspect of the invention, in the printing apparatus, the data deleting unit deletes the stored password and the decrypted data when a predetermined time elapses after inputting the password.

According to aspects of the printing apparatus of the invention, a plurality of data files encrypted by using the same password stored in the same storage device can be continuously printed out without again inputting the password when direct printing is performed and the time-consuming operation of repeatedly inputting passwords can be eliminated. Thus, usability can be improved.

If a password is set for each individual data file, the data files are encrypted by mutually different passwords, respectively. As a result, the security level is heightened, and desirable data management can be carried out. However, usually, a user uses a large number of data files. If unique passwords are set for the different data files, the user cannot memorize so many passwords.

Therefore, in most cases, the number of passwords used by a single user is two or three, and it is not uncommon for the user to use the same password for a plurality of data files.

In these cases, if a plurality of encrypted data files are stored in a storage device and are printed out by a printer in a direct printing mode, the same password must be troublesomely input repeatedly by the number of printing operations. However, if the printer memorizes a password that has been input once, there is no need to repeatedly input the password when a data file having the same password is again printed out, thus improving usability.

Concerning security, since a user connects the storage device directly with the printer and then inputs a password, security is not lowered even if the password is stored in the printer, because the password is eliminated at a timing, e.g., when the user leaves the printer.

Further, according to aspects of the printing apparatus of the invention, files that can be printed out can be retrieved on the side of the printing apparatus, and a user can be informed of data that can be printed out by the input password.

As a result, the user can grasp data that can be printed out.

Still further, according to aspects of the printing apparatus of the invention, when a user prints out files, if a password is first input, printing can be performed without time loss thereafter.

Still further, according to aspects of the printing apparatus of the invention, an easy judgment can be made about how much decryptable data and unencrypted data are stored in the storage device.

Encrypted data that cannot be decrypted by an input password may be displayed on the display unit, and may be printed out by the print engine.

Since the display of the printing apparatus has a limited space, an at-a-glance easy recognition can be improved by printing out the data.

Still Further, according to aspects of the printing apparatus of the invention, a case never occurs in which a password remains in the printing apparatus after a user uses the printing apparatus, so that the password is misused. Therefore, the security level is heightened.

What is claimed is:

1. A printing apparatus comprising:
    a print engine that prints data;
    a data reading unit that reads data from a storage device that stores a plurality of pieces of data, the data reading unit being connectable to the storage device;
    an input panel that accepts an input password used to decrypt encrypted pieces of data stored in the storage device;
    a password storing unit that stores the input password;
    wherein the plurality of pieces of data stored on the storage device can include:
        unencrypted pieces of data,
        decryptable encrypted pieces of data that can be decrypted using the stored password, and
        undecryptable encrypted pieces of data that cannot be decrypted using the stored password;
    a data decrypting unit that uses the stored password to decrypt some of the encrypted pieces of data;
    a decrypted data storing unit that temporarily stores the decrypted data; and
    a re-decrypting unit that decrypts other pieces of encrypted data stored in the storage device by using the stored password, the re-decrypting unit including a data retrieving unit that retrieves a plurality of decryptable encrypted pieces of data from the plurality of pieces of data stored in the storage device;
    a retrieved encrypted data decrypting unit that decrypts the plurality of retrieved decryptable encrypted pieces of data using the stored password,
    wherein said printing apparatus is configured so that said storage device can be connected to or disconnected from the printing apparatus while the printing apparatus is operating,
    wherein the re-decrypting unit also includes:
        a determined-data printing unit that displays at least one unencrypted piece of data and the plurality of retrieved decryptable encrypted pieces of data on a display unit and controls the print engine to print out at least one of the plurality of decryptable encrypted pieces of data or the at least one unencrypted piece of data based on a selection made from the plurality of decryptable encrypted pieces of data and the at least one unencrypted piece of data without requiring reentry of the password by a user.

2. The printing apparatus according to claim 1, wherein the data retrieving unit retrieves all decryptable encrypted pieces of data from the plurality of pieces of data stored in the storage device, and wherein the retrieved encrypted data decrypting unit decrypts all the retrieved decryptable encrypted pieces of data by using the stored password.

3. The printing apparatus according to claim 2, wherein the determined-data printing unit displays the at least one unencrypted piece of data and all the retrieved decryptable encrypted pieces of data stored on the storage device on the display unit and controls the print engine to print out at least one of the decryptable encrypted pieces of data or the unencrypted data based on a selection made from all of the decryptable encrypted pieces of data and the at least one unencrypted piece of data without requiring reentry of the password by the user.

4. The printing apparatus according to claim 1, wherein the re-decrypting unit includes:
    a retrieved and decrypted data storing unit that stores the decrypted retrieved data decrypted by the retrieved data decrypting unit.

5. The printing apparatus according to claim 1, further comprising:
    a data deleting unit that deletes the stored password from the password storing unit and deletes the decrypted data from the decrypted data storing unit.

6. The printing apparatus according to claim 5, wherein the data deleting unit deletes the stored password and the decrypted data when a connection between the storage device and the data reading unit is disconnected.

7. The printing apparatus according to claim 5, wherein the data deleting unit deletes the stored password and the decrypted data when a predetermined time elapses after inputting the password.

8. The printing apparatus according to claim 1, wherein the stored password used by the re-decrypting unit is the same as the password used by the data decrypting unit.

9. A printing apparatus comprising:
    a print engine that prints data;
    a data reading unit that reads data from a storage device that stores a plurality of pieces of data, the data reading unit being connectable to the storage device;
    an input panel that accepts an input password used to decrypt encrypted pieces of data stored in the storage device;
    a password storing unit that stores the input password;
    wherein the plurality of pieces of data stored on the storage device can include:
        unencrypted pieces of data, decryptable encrypted pieces of data that can be decrypted using the stored password, and
undecryptable encrypted pieces of data that cannot be decrypted using the stored password;
a data decrypting unit that uses the stored password to decrypt decryptable encrypted pieces of data, the decrypting unit using the password stored in the password storage unit to decrypt at least two different decryptable encrypted pieces of data; and
a determined-data printing unit that displays at least one unencrypted piece of data and a plurality of decryptable encrypted pieces of data on the display unit and controls the print engine to print out at least one of the plurality of decryptable encrypted pieces of data or the at least one unencrypted piece of data based on a selection made from the plurality of decryptable encrypted pieces of data and the at least one encrypted piece of data without requiring reentry of the password by the user,
wherein said printing apparatus is configured so that said storage device can be connected to or disconnected from the printing apparatus while the printing apparatus is operating.

10. The printing apparatus according to claim 9, further comprising:
a data deleting unit that deletes the stored password from the password storing unit and deletes the decrypted data from the decrypted data storing unit.

11. The printing apparatus according to claim 10, wherein the data deleting unit deletes the stored password and the decrypted data when a connection between the storage device and the data reading unit is disconnected.

12. The printing apparatus according to claim 10, wherein the data deleting unit deletes the stored password and the decrypted data when a predetermined time elapses after inputting the password.

13. The printing apparatus according to claim 1,
wherein the printing apparatus is configured to execute an index printing process in which an image of files stored in the storage device is output as an index, and
wherein only unencrypted files and decryptable encrypted files that can be decrypted by the stored password are displayed.

14. The printing apparatus according to claim 9,
wherein the printing apparatus is configured to execute an index printing process in which an image of files stored in the storage device is output as an index, and
wherein only unencrypted files and decryptable encrypted files that can be decrypted by the stored password are displayed.

15. The printing apparatus according to claim 1,
wherein the storage device is a removable USB memory.

16. The printing apparatus according to claim 9,
wherein the storage device is a removable USB memory.

* * * * *